United States Patent
Ito et al.

(10) Patent No.: US 7,616,252 B2
(45) Date of Patent: Nov. 10, 2009

(54) CONTROL APPARATUS, CONTROL METHOD, COMPUTER PROGRAM, AND CAMERA

(75) Inventors: Yujiro Ito, Kanagawa (JP); Hidekazu Suto, Tokyo (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 596 days.

(21) Appl. No.: 11/398,687

(22) Filed: Apr. 6, 2006

(65) Prior Publication Data
US 2006/0232697 A1    Oct. 19, 2006

(30) Foreign Application Priority Data
Apr. 15, 2005    (JP)    ............................. 2005-118318

(51) Int. Cl.
G03B 13/00 (2006.01)
H04N 5/232 (2006.01)
H04N 5/228 (2006.01)

(52) U.S. Cl. ............... 348/345; 348/208.4; 348/208.12; 348/349; 348/354; 348/355; 396/89; 396/93

(58) Field of Classification Search ............. 396/89–93, 396/101–102, 124–125; 348/208.99, 208.12, 348/208.4, 345–356
See application file for complete search history.

(56) References Cited

U.S. PATENT DOCUMENTS

| | | | | |
|---|---|---|---|---|
| 5,798,793 A * | 8/1998 | Tanaka | ........................ | 348/347 |
| 5,862,415 A * | 1/1999 | Matsumoto | ................... | 396/55 |
| 6,362,852 B2 | 3/2002 | Ito | | |
| 2002/0154241 A1* | 10/2002 | Ohkawara | .................... | 348/345 |
| 2002/0191099 A1* | 12/2002 | Okisu et al. | .................. | 348/345 |
| 2004/0090551 A1* | 5/2004 | Yata | ............................ | 348/354 |
| 2004/0125229 A1* | 7/2004 | Aoyama et al. | ............. | 348/345 |
| 2006/0104619 A1* | 5/2006 | Yanagi | ........................ | 396/50 |

FOREIGN PATENT DOCUMENTS

| | | |
|---|---|---|
| JP | 64-62975 | 3/1989 |
| JP | 8-265621 | 10/1996 |
| JP | 10-39198 | 2/1998 |
| JP | 10-161016 | 6/1998 |
| JP | 10-215403 | 8/1998 |
| JP | 2004-117775 | 4/2004 |
| WO | WO97/25812 | 7/1997 |

* cited by examiner

*Primary Examiner*—Jason Chan
*Assistant Examiner*—Michael Osinski
(74) *Attorney, Agent, or Firm*—Oblon, Spivak, McClelland, Maier & Neustadt, L.L.P.

(57) ABSTRACT

A control apparatus for controlling a driver driving an optical element of an image pickup device to adjust a focus position of the image pickup device in the capturing of an image of a subject, includes a relative angle variation calculating unit for calculating a relative angle variation, a mode change detecting unit for detecting of a change of a mode of the relative angle variation through determining whether the mode of the relative angle variation, calculated by the relative angle variation calculating unit, is a stable mode involving a small amount of change or an unstable mode involving a large amount of change, and a focus position control process startup unit for managing a startup of a focus position control process controlling the focus position through controlling the driver in response to a pattern of the change of the mode detected by the mode change detecting unit.

18 Claims, 19 Drawing Sheets

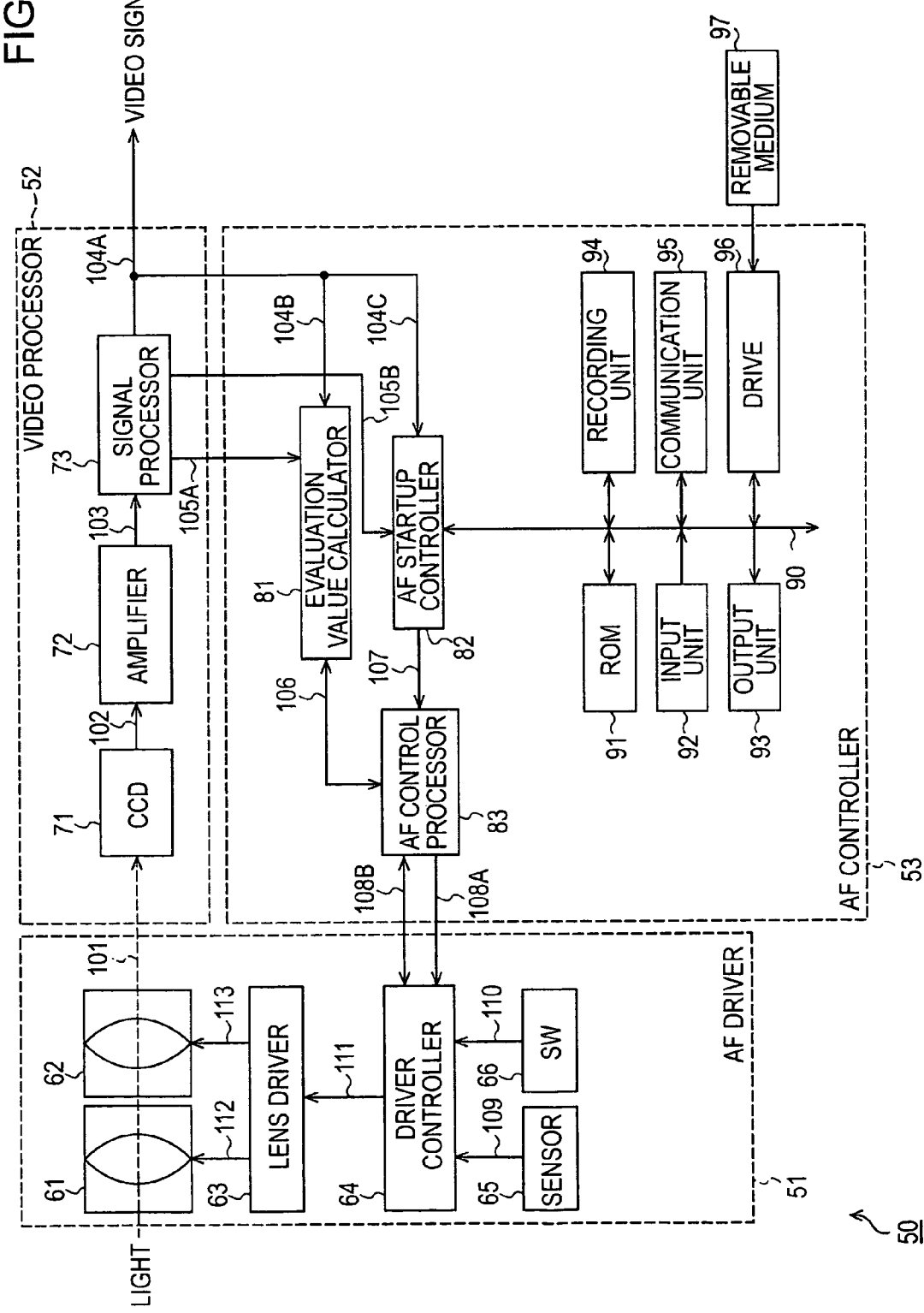

CONTROL APPARATUS, CONTROL METHOD, COMPUTER PROGRAM, AND CAMERA

CROSS REFERENCES TO RELATED APPLICATIONS

The present invention contains subject matter related to Japanese Patent Application JP 2005-118318 filed in the Japanese Patent Office on Apr. 15, 2005, the entire contents of which are incorporated herein by reference.

BACKGROUND OF THE INVENTION

1. Field of the Invention

The present invention relates to a control apparatus, a control method, a computer program, and a camera. More particularly, the present invention relates to a control apparatus, a control method, a computer program, and a camera for reducing an amount of process in an auto-focusing operation.

2. Description of the Related Art

Known image pickup apparatuses are typically provided with an auto-focus (AF) function to automatically focus on a subject. International Patent Publication No. WO 97/25812 discloses a technique of AF process that detects a contrast of a captured image of a subject, and adjusts the position of a lens to reach the highest contrast (image processing technique).

The image pickup apparatus calculates an evaluation value, as a parameter evaluating an out-of-focus level of an image, within a predetermined area (evaluation frame) in a captured image from the contrast of the image (for example, high-frequency component of a luminance value), searches for the maximum evaluation value (peak value) while shifting focus position, and focuses on the subject at a position where the peak value is attained. In this way, the image pickup apparatus is accurately in focus on the subject within the field of view thereof.

The AF process is started when a user presses a shutter button half the stroke thereof, and is completed when the captured image is determined to be in focus on the subject. Such an AF process that is performed each time the user issues a command is referred to as a one-shot AF process.

An image pickup apparatus, such as a video camera, performs the AF process without any command from the user. Such an image pickup apparatus repeatedly performs condition determination operations in the AF process, and starts the above-referenced one-shot AF process when a predetermined condition is satisfied. One of startup conditions is a change in an evaluation value of contrast. For example, an image pickup apparatus evaluates an out-of-focus level of an image (high-frequency component of a luminance value) within a predetermined area (evaluation frame) in a captured image from the contrast of the image, and starts the one-shot AF process when a change in the evaluation value becomes equal to or above a threshold value. The image pickup apparatus can thus continuously be in focus on a subject within the evaluation frame by evaluating the out-of-focus level of the captured image and controlling the AF process based on the evaluation value.

A variety of methods of performing appropriately the AF process are contemplated. For example, Japanese Unexamined Patent Application Publication No. 10-215403 discloses one technique in which a lens is wobbled within a tiny range to efficiently search for an optimum focus position and, and the direction of movement of the lens is determined based on an evaluation value of the captured image. Japanese Unexamined Patent Application Publication No. 10-161016 discloses another technique. According to the disclosure, the size of an evaluation frame over which an evaluation value is calculated is modified based on conditions so that an optimum AF process is performed within a wide range of photographing conditions.

In such image processing type AF processes, the image pickup apparatus moves the lens to be in focus on the subject while viewing the captured image. A length of time is thus required before the AF process is completed (with in-focus state reached). For example, when the image pickup apparatus changes the direction of photographing (during panning or tilting), the subject within the evaluation frame successively changes. From when the image pickup apparatus determines that the in-focus state to the subject has been reached in the AF process to when the AF process is actually completed by moving a lens to the in-focus state, distance to the subject photographed in the evaluation frame can vary, leading to an unsuccessful focusing operation.

As shown in FIG. 1A, a camera 1 now pans, successively photographing a subject A, a subject B, and a subject C as represented by an arrow-headed curve line 2. Each of the distance 3 from the camera 1 to the subject A and the distance 5 from the camera 1 to the subject C is shorter than the distance 4 from the camera 1 to the subject B. The evaluation value of the image captured by the camera 1 during panning changes as represented by a plot 6 of FIG. 1B.

The distance 4 is longer than the distance 3. The evaluation value substantially drops at time t2 the subject B is photographed within the evaluation frame, and the AF process is thus started. The panning continues, and the subject C is photographed in the evaluation frame when the lens driving is almost ended. More specifically, the camera 1 fails to be in focus on the subject C with the focus position remaining in alignment with the distance 4. At time t3 thereafter, the evaluation value becomes stabilized, keeping the AF process untriggered. The image is thus captured with the subject C out of focus. The same is true of a tilting operation.

Out-of-focus problems also take place in cases other than the panning and tilting operations. As shown in FIG. 2A, a subject 12 is photographed in an evaluation frame 11 in a photographing frame 10. The subject 12 now repeatedly enters and the leaves the evaluation frame 11 as a result of wind, thereby swinging laterally rather than fore and aft. The evaluation value thus greatly varies as represented by a plot of FIG. 2B. The AF process is frequently started. In the AF process, lens is driven, causing the focus position to be moved. As a result, the captured image is hard to view and the focus position remains unstable.

SUMMARY OF THE INVENTION

The controlling of a focus position at fine steps with a lens wobbled is contemplated to overcome the above-mentioned problems. In the AF process, the lens is initially driven at fine steps (i.e., wobbled) to determine the direction of lens driving (i.e., to determine whether to drive the lens in a forward direction or a backward direction to achieve in-focus state). The lens driving direction is thus determined as a result of wobbling, and the lens is then actually driven in the determined direction.

By performing the wobbling operation frequently, a focus position control process is performed before a subject becomes too out-of-focus. With this arrangement, a process time required to perform the focus position control is thus substantially reduced. Even in the case of the panning operation (also in the case of the tilting operation) as shown in FIG.

1A, the camera is set successively to be in focus on the subject A, the subject B, and then the subject C. In the case of professional cameras with large and heavy lenses, however, the wobbling speed is slow and the panning (tilting) speed is also slow. The effectiveness of such a technique cannot be sufficiently exploited.

The professional camera is typically used for a long period of time. In comparison with ordinary cameras, the professional camera is used in severe environments. If the wobbling operation is constantly performed under a severe environment, the camera can be damaged soon, leading to a short service life.

In the case of FIGS. 2A and 2B, the wobbling operation is repeated and the focus position is finely vibrated. If the camera takes a high-definition picture, an even fine vibration in the focus position becomes pronounced in the high-definition picture. Image quality thus drops, causing a viewer to feel odd about the photographed image.

The size of the evaluation frame can be enlarged not to start up the AF process in FIGS. 2A and 2B. For example, the entire photographing frame 10 is set as the evaluation frame. The startup of the AF process is thus prevented because the evaluation value of the camera is not changed even if the subject 12 is swung across the evaluation frame. With this arrangement, the user cannot control the camera as to where to focus on within the photographing frame 10. The photographing operation may become difficult.

Another method can be contemplated to adaptively control the AF process with the evaluation frame set to be variable in accordance with the (swinging) motion of the subject. However, it is still difficult to switch the evaluation frame in a manner free from any problem, and a controller (control process) with a complex structure is obviously needed, leading to a substantial increase in manufacturing costs.

It is thus desirable to reduce an auto-focus process with unnecessary portion thereof eliminated.

In accordance with one embodiment of the present invention, a control apparatus includes a relative angle variation calculating unit for calculating a relative angle variation, the relative angle variation being a change per unit time of a relative angle of an image pickup device with respect to a subject, a mode change detecting unit for detecting of a change of a mode of the relative angle variation through determining whether the mode of the relative angle variation, calculated by the relative angle variation calculating unit, is a stable mode involving a small amount of change or an unstable mode involving a large amount of change, and a focus position control process startup unit for managing a startup of a focus position control process, the focus position control process for controlling the focus position through controlling a driver in response to a pattern of the change of the mode detected by the mode change detecting unit.

Preferably, the control apparatus further includes a focus position control process executing unit for executing the focus position control process started by the focus position control process startup unit.

Preferably, the focus position control process startup unit starts the focus position control process if the change of the mode detected by the mode change detecting unit is a change from the unstable mode to the stable mode.

Preferably, the focus position control process startup unit starts the focus position control process only if the change of the mode detected by the mode change detecting unit is a change from the unstable mode to the stable mode.

The relative angle variation calculating unit includes an in-field integrated luminance value calculator for calculating an in-field integrated luminance value through integrating a luminance value of each pixel of the captured image of the subject within a field, a mean value calculator for calculating the mean value of the in-field integrated luminance values, calculated by the in-field integrated luminance value calculator, within a time range having a predetermined time length, a difference calculator for calculating a difference value between the mean value of a first time range, equal to the time range having the predetermined time length, containing the current field and the mean value of a second time range immediately prior to the first time range, each mean value calculated by the mean value calculator, and a normalizer for normalizing the difference value, calculated by the difference calculator, with the in-field integrated luminance value of the current field and the length of the time range, and handling the normalized difference value as the relative angle variation.

Preferably, the in-field integrated luminance value calculator integrates the luminance values in a predetermined area in the captured image and handles the resulting value as the in-field integrated luminance value.

Preferably, the predetermined area is set up independently of an area over which a parameter for use in the focus position control process is calculated.

Preferably, the predetermined area contains an area over which a parameter for use in the focus position control process is calculated.

Preferably, the predetermined area is the entire captured image.

Preferably, the mode change detecting unit includes a mode determiner for comparing the relative angle variation, calculated by the relative angle variation calculating unit, with a predetermined threshold value, and determining that the mode is a stable mode if the relative angle variation is smaller than the predetermined threshold value and determining that the mode is an unstable mode if the relative angle variation is equal to or greater than the predetermined threshold value, an update verifier for verifying, based on the determination result of the mode determining unit, whether the setting of the mode is updated, and a mode change pattern determiner for determining the pattern of the change of the mode at the updating of the mode setting verified by the update verifier.

Preferably, the control apparatus further includes an evaluation value calculating unit for calculating an evaluation value, evaluating an out-of-focus level of the captured image of the subject, as a parameter for the focus position control process, and an evaluation value change detecting unit for detecting a change in the evaluation value calculated by the evaluation value calculating unit. The focus position control process startup unit starts the focus position control process in response to the change in the evaluation value detected by the evaluation value change detecting unit even if the mode change detecting unit does not detect a change in the mode with the mode remaining to be the stable mode.

Preferably, the evaluation value change detecting unit includes an evaluation value addition calculator for adding the evaluation values, calculated by the evaluation value calculating unit, in each predetermined time range, a reference addition result storage for storing, as a reference addition result, an addition result obtained at the shifting from the unstable mode to the stable mode, from among the addition results obtained as a result of addition performed by the evaluation value addition calculator, an evaluation value variation rate calculator for calculating an evaluation value variation rate based on the addition result provided by the evaluation value addition calculator and the reference addition result stored on the reference addition result storage, and an evaluation value variation rate determiner for determining whether to start the focus position control process, based on the evaluation value variation rate calculated by the evaluation value variation rate calculator.

Preferably, the control apparatus further includes an integrated luminance value change detecting unit for detecting a change in an in-field integrated luminance value based on the in-field integrated luminance value calculated by the relative angle variation calculating unit. The focus position control process startup unit starts the focus position control process in response to the change in the in-field integrated luminance value detected by the integrated luminance value change detecting unit even if the mode change detecting unit detects no change in mode with the mode remaining to be the stable mode.

Preferably, the integrated luminance value change detecting unit includes a latest in-field integrated luminance value acquisition unit for acquiring the latest in-field integrated luminance value calculated by the relative angle variation calculating unit, a reference in-field integrated luminance value storage for storing, as a reference in-field integrated luminance value, the in-field integrated luminance value obtained at the shifting from the unstable mode to the stable mode, from among the in-field integrated luminance values acquired by the latest in-field integrated luminance value acquisition unit, an integrated luminance value variation rate calculator for calculating an integrated luminance value variation rate as a variation rate of the in-field integrated luminance value, based on the latest in-field integrated luminance value acquired by the latest in-field integrated luminance value acquisition unit and the reference in-field integrated luminance value stored on the reference in-field integrated luminance value storage, and an integrated luminance value variation rate determiner for determining whether to start the focus position control process, based on the integrated luminance value variation rate calculated by the integrated luminance value variation rate calculator.

In accordance with another embodiment of the present invention, a control method includes a relative angle variation calculating step of calculating a relative angle variation, based on the captured image of the subject provided by an image pickup device, the relative angle variation being a change per unit time of a relative angle of the image pickup device with respect to a subject, a mode change detecting step of detecting of a change of a mode of the relative angle variation through determining whether the mode of the relative angle variation, calculated in the relative angle variation calculation step, is a stable mode involving a small amount of change or an unstable mode involving a large amount of change, a startup determination step of determining whether to start a focus position control process, the focus position control process for controlling the focus position through controlling a driver in response to a change pattern of the change of the mode detected in the mode change detecting step, and a focus position control process startup step of starting the focus position control process based on the determination result of the start determination step in order to cause the driver to adjust the focus position.

In accordance with yet another embodiment of the present invention, a computer program product includes a relative angle variation calculating step of calculating a relative angle variation, based on a captured image of a subject provided by an image pickup device, the relative angle variation being a change per unit time of a relative angle of the image pickup device with respect to the subject, a mode change detecting step of detecting of a change of a mode of the relative angle variation through determining whether the mode of the relative angle variation, calculated in the relative angle variation calculation step, is a stable mode involving a small amount of change or an unstable mode involving a large amount of change, a startup determination step of determining whether to start a focus position control process, the focus position control process for controlling the focus position through controlling a driver in response to a change pattern of the change of the mode detected in the mode change detecting step, and a focus position control process startup step of starting the focus position control process based on the determination result of the start determination step in order to cause the driver to adjust the focus position.

In accordance with a further embodiment of the present invention, a camera includes a relative angle variation calculating unit for calculating a relative angle variation, the relative angle variation being a change per unit time of a relative angle of an image pickup device with respect to a subject, a mode change detecting unit for detecting of a change of a mode of the relative angle variation through determining whether the mode of the relative angle variation, calculated by the relative angle variation calculating unit, is a stable mode involving a small amount of change or an unstable mode involving a large amount of change, a focus position control process startup unit for managing a startup of a focus position control process, the focus position control process for controlling the focus position through controlling the driver in response to a pattern of the change of the mode detected by the mode change detecting unit, and a focus position control process executing unit for executing the focus position control process, started by the focus position control process startup unit, the focus position control process controlling a driver to control the focus position.

In accordance with embodiments of the present invention, the relative angle variation is calculated, and the determination of whether the mode of the relative angle variation is a stable mode involving a small amount of change or an unstable mode involving a large amount of change is performed. The change of the mode is detected based on the determination result. The focus position control process is started depending on the pattern of the change of the mode.

In accordance with embodiments of the present invention, an unnecessary portion of the auto-focus process is easily eliminated.

BRIEF DESCRIPTION OF THE DRAWINGS

FIG. 3 is a block diagram of an image pickup apparatus in accordance with one embodiment of the present invention;

DESCRIPTION OF THE PREFERRED EMBODIMENTS

Figure 1A:
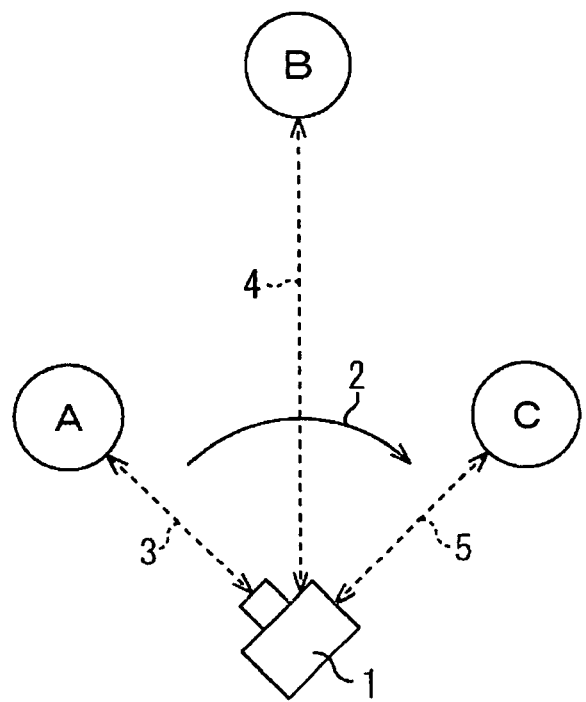
FIGS. 1A and 1B illustrate an example of a known auto-focus process.
Figure 1B:
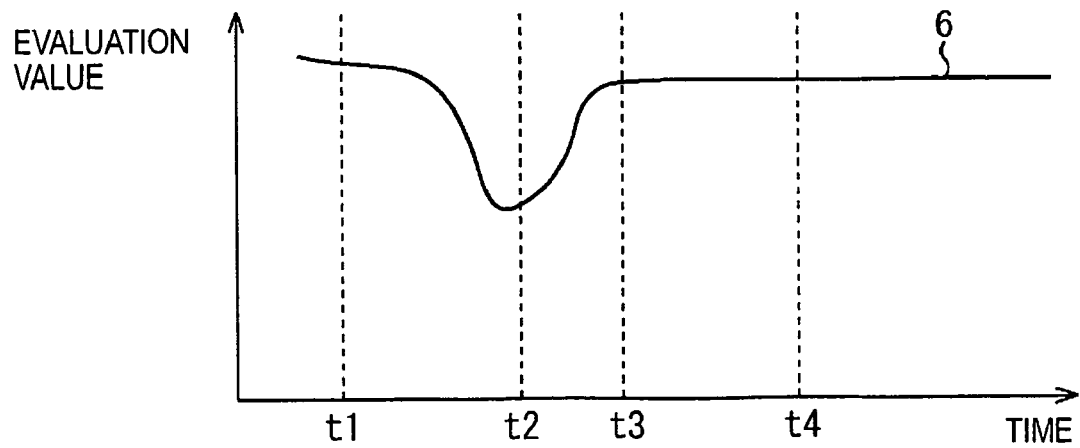
Figure 2A:
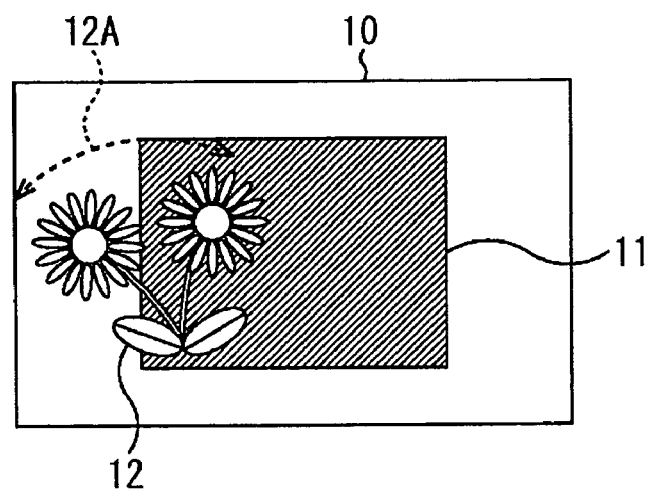
FIGS. 2A and 2B illustrate another example of known auto-focus process.
Figure 2B:
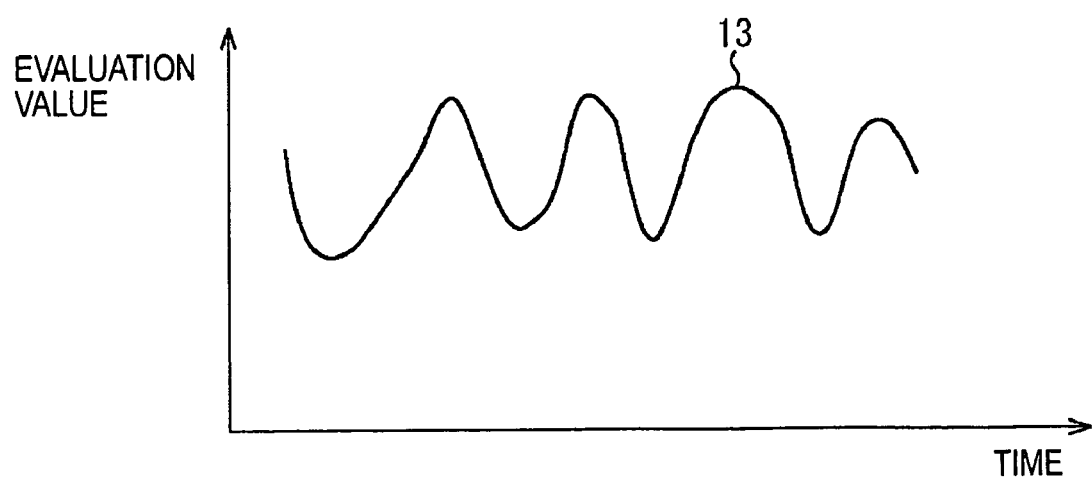

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

In accordance with one embodiment of the present invention, a control apparatus (for example, an AF controller 53 of FIG. 3) controls a driver (for example, an AF driver 51 of FIG. 3) driving an optical element (for example, a focusing lens 61 and a wobbling lens 62 of FIG. 3) of an image pickup device (for example, an image pickup apparatus 50 of FIG. 3) to adjust a focus position of the image pickup device in the capturing of an image of a subject. The control apparatus includes a relative angle variation calculating unit (for example, an relative angle variation calculator 121 of FIG. 4) for calculating a relative angle variation, the relative angle variation being a change per unit time of a relative angle of the image pickup device with respect to the subject, a mode change detecting unit (for example, a mode change detector 122 of FIG. 4) for detecting of a change of a mode of the relative angle variation through determining whether the mode of the relative angle variation, calculated by the relative angle variation calculating unit, is a stable mode involving a small amount of change or an unstable mode involving a large amount of change, and a focus position control process startup unit (for example, an AF startup command output unit 123 of FIG. 4) for managing a startup of a focus position control process, the focus position control process for controlling the focus position through controlling the driver in response to a pattern of the change of the mode detected by the mode change detecting unit.

The control apparatus further includes a focus position control process executing unit (for example, an AF control processor 83 of FIG. 3) for executing the focus position control process started by the focus position control process startup unit.

Figure 4:
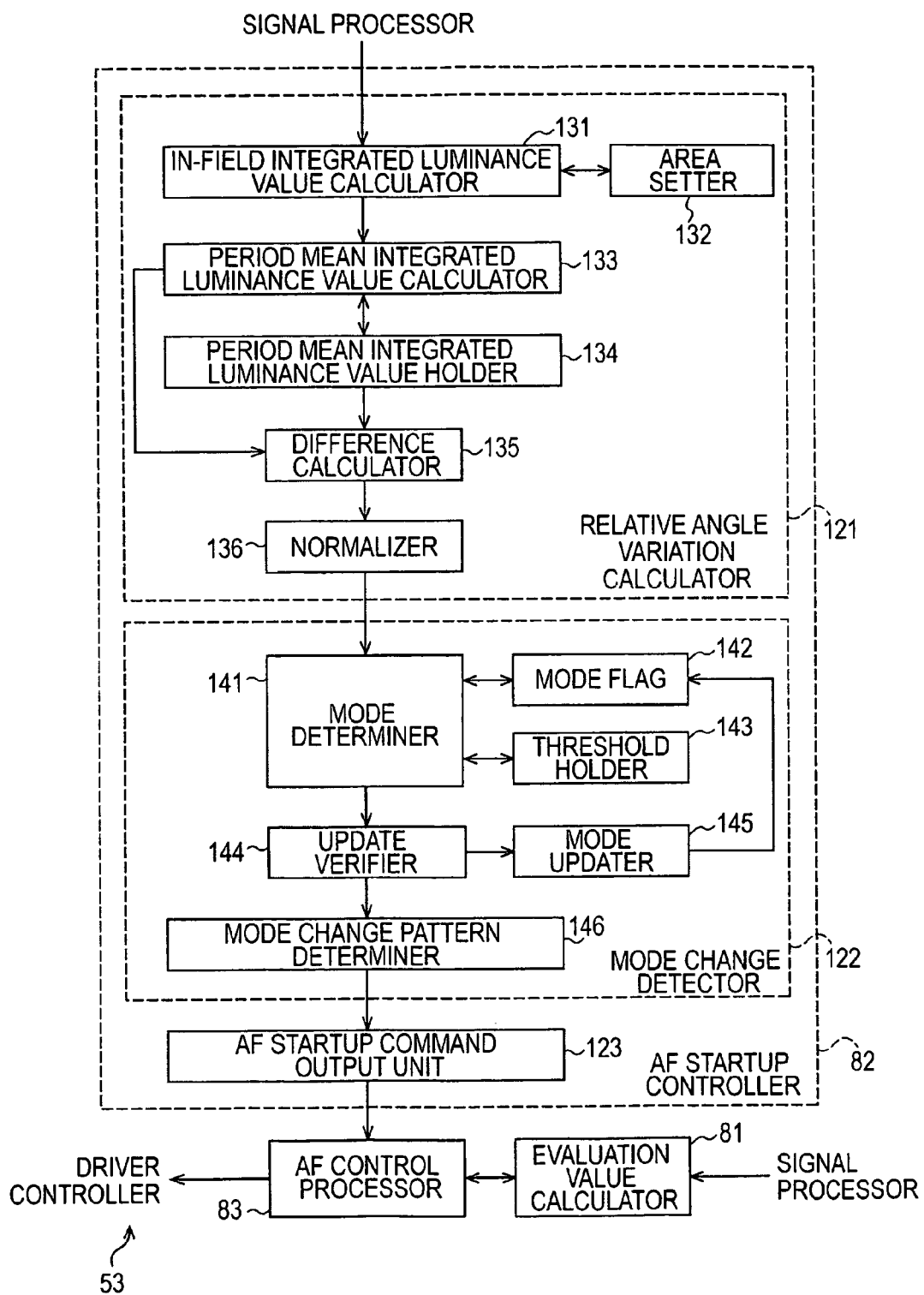
FIG. 4 is a block diagram illustrating in detail an AF startup controller of FIG. 3.

The relative angle variation calculating unit includes an in-field integrated luminance value calculator (for example, an in-field integrated luminance value calculator 131 of FIG. 4) for calculating an in-field integrated luminance value through integrating a luminance value of each pixel of the captured image of the subject within a field, a mean value calculator (for example, a period mean integrated luminance value calculator 133 of FIG. 4) for calculating the mean value of the in-field integrated luminance values, calculated by the in-field integrated luminance value calculator, within a time range having a predetermined time length, a difference calculator (for example, a difference calculator 135 of FIG. 4) for calculating a difference value between the mean value of a first time range, equal to the time range having the predetermined time length, containing the current field and the mean value of a second time range immediately prior to the first time range, each mean value calculated by the mean value calculator, and a normalizer (for example, a normalizer 136 of FIG. 4) for normalizing the difference value, calculated by the difference calculator, with the in-field integrated luminance value of the current field and the length of the time range, and handling the normalized difference value as the relative angle variation.

The mode change detecting unit includes a mode determiner (for example, a mode determiner 141 of FIG. 4) for comparing the relative angle variation, calculated by the relative angle variation calculating unit, with a predetermined threshold value, and determining that the mode is a stable mode if the relative angle variation is smaller than the predetermined threshold value and determining that the mode is an unstable mode if the relative angle variation is equal to or greater than the predetermined threshold value, an update verifier (for example, an update verifier 144 of FIG. 4) for verifying, based on the determination result of the mode determining unit, whether the setting of the mode is updated, and a mode change pattern determiner (for example, a mode change pattern determiner 146 of FIG. 4) for determining the pattern of the change of the mode at the updating of the mode setting verified by the update verifier.

The control apparatus further includes an evaluation value calculating unit (for example, an evaluation value calculator 211 of FIG. 11) for calculating an evaluation value, evaluating an out-of-focus level of the captured image of the subject, as a parameter for the focus position control process, and an evaluation value change detecting unit (for example, an evaluation value change detector 231 of FIG. 12) for detecting a change in the evaluation value calculated by the evaluation value calculating unit. The focus position control process startup unit starts the focus position control process in response to the change in the evaluation value detected by the evaluation value change detecting unit even if the mode change detecting unit does not detect a change in the mode with the mode remaining to be the stable mode.

Figure 12:
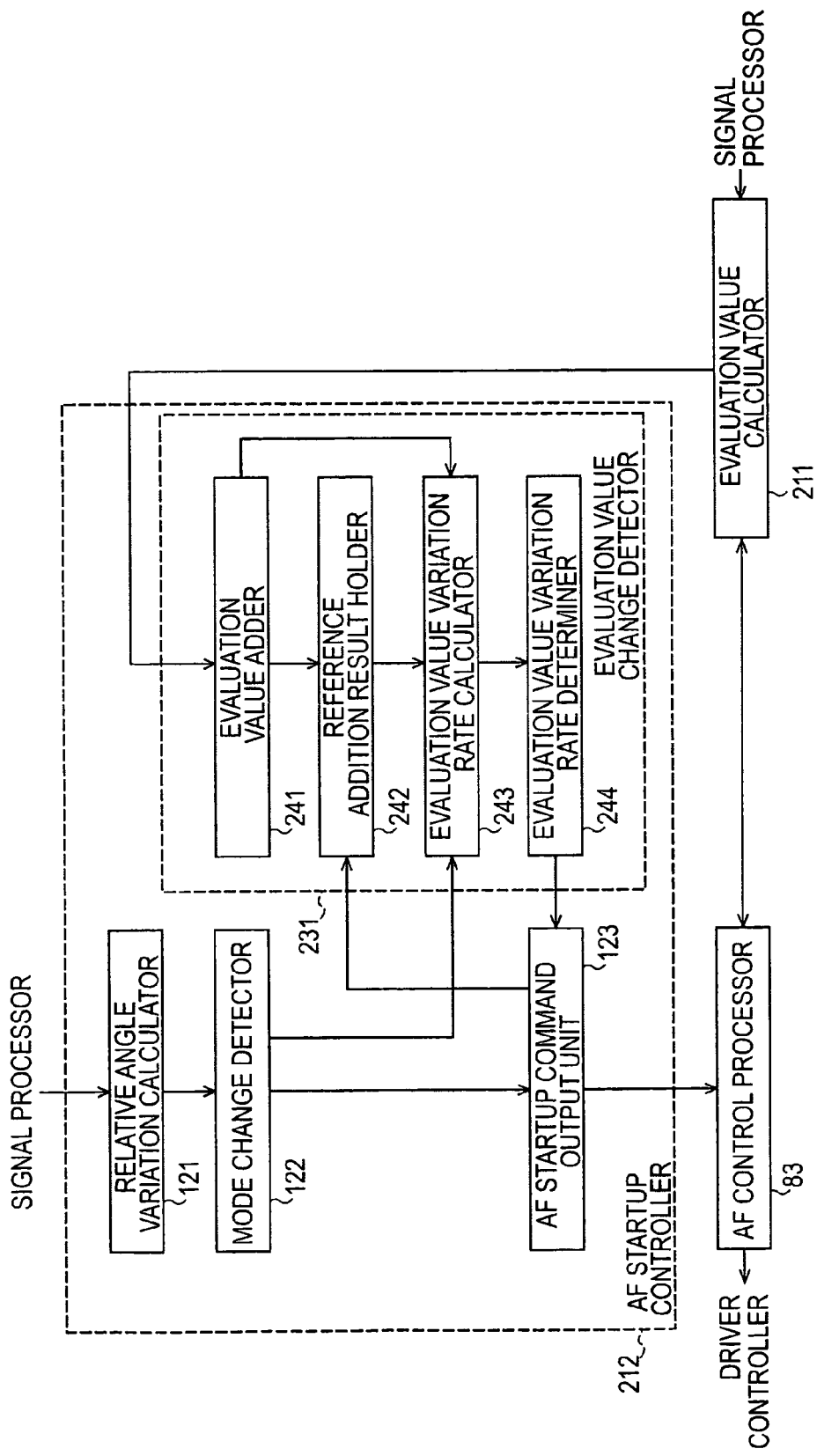
FIG. 12 is a block diagram illustrating in detail an AF startup controller of FIG. 11.

The evaluation value change detecting unit includes an evaluation value addition calculator (for example, an evaluation value adder 241 of FIG. 12) for adding the evaluation values, calculated by the evaluation value calculating unit, in each predetermined time range, a reference addition result storage (for example, a reference additional result holder 242 of FIG. 12) for storing, as a reference addition result, an addition result obtained at the shifting from the unstable mode to the stable mode, from among the addition results obtained as a result of addition performed by the evaluation value addition calculator, an evaluation value variation rate calculator (for example, an evaluation value variation rate calculator 243 of FIG. 12) for calculating an evaluation value variation rate based on the addition result provided by the evaluation value addition calculator and the reference addition result stored on the reference addition result storage, and an evaluation value variation rate determiner (for example, an evaluation value variation rate determiner 244 of FIG. 12) for determining whether to start the focus position control process, based on the evaluation value variation rate calculated by the evaluation value variation rate calculator.

Figure 16:
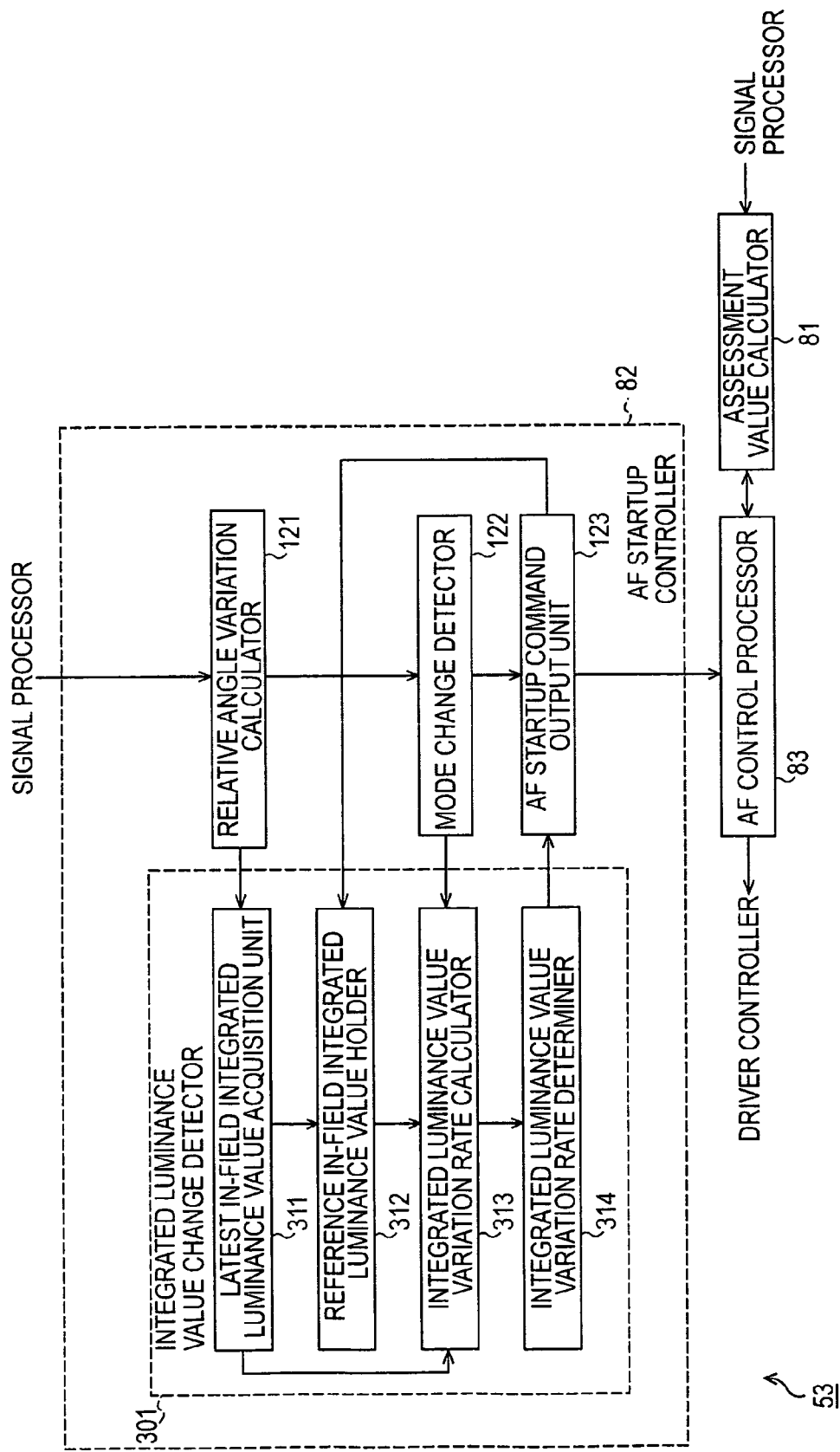
FIG. 16 is a block diagram illustrating another example of the AF startup controller of FIG. 3.

The control apparatus further includes an integrated luminance value change detecting unit (for example, an integrated luminance value change detector 301 of FIG. 16) for detecting a change in an in-field integrated luminance value based on the in-field integrated luminance value calculated by the relative angle variation calculating unit. The focus position control process startup unit starts the focus position control process in response to the change in the in-field integrated luminance value detected by the integrated luminance value change detecting unit even if the mode change detecting unit detects no change in mode with the mode remaining to be the stable mode.

The integrated luminance value change detecting unit includes a latest in-field integrated luminance value acquisition unit (for example, a latest in-field integrated luminance value acquisition unit 311 of FIG. 16) for acquiring the latest in-field integrated luminance value calculated by the relative angle variation calculating unit, a reference in-field integrated luminance value storage (for example, a reference in-field integrated luminance value holder 312 of FIG. 16) for storing, as a reference in-field integrated luminance value, the in-field integrated luminance value obtained at the shifting from the unstable mode to the stable mode, from among the in-field integrated luminance values acquired by the latest in-field integrated luminance value acquisition unit, an integrated luminance value variation rate calculator (for example, an integrated luminance value variation rate calculator 313 of FIG. 16) for calculating an integrated luminance value variation rate as a variation rate of the in-field integrated luminance value, based on the latest in-field integrated luminance value acquired by the latest in-field integrated luminance value acquisition unit and the reference in-field integrated luminance value stored on the reference in-field integrated luminance value storage, and an integrated luminance value variation rate determiner (for example, an integrated luminance value variation rate determiner 314 of FIG. 16) for determining whether to start the focus position control process, based on the integrated luminance value variation rate calculated by the integrated luminance value variation rate calculator.

Another embodiment of the present invention relates to a control method of a control apparatus (for example, an AF controller 53 of FIG. 3) controlling a driver (for example, an AF driver 51 of FIG. 3) driving an optical element (for example, a focusing lens 61 and a wobbling lens 62 of FIG. 3) of an image pickup device (for example, an image pickup apparatus 50 of FIG. 3) to adjust a focus position of the image pickup device in the capturing of an image of a subject. The control method includes a relative angle variation calculating step (for example, step S1 of FIG. 8) of calculating a relative angle variation, based on the captured image of the subject provided by the image pickup device, the relative angle variation being a change per unit time of a relative angle of the image pickup device with respect to the subject, a mode change detecting step (for example, step S2 of FIG. 8) of detecting of a change of a mode of the relative angle variation through determining whether the mode of the relative angle variation, calculated in the relative angle variation calculation step, is a stable mode involving a small amount of change or an unstable mode involving a large amount of change, a startup determination step (for example, step S3 of FIG. 8) of determining whether to start a focus position control process, the focus position control process for controlling the focus position through controlling the driver in response to a change pattern of the change of the mode detected in the mode change detecting step, and a focus position control process startup step (for example, step S4 of FIG. 8) of starting the focus position control process based on the determination result of the start determination step in order to cause the driver to adjust the focus position.

In accordance with yet another embodiment of the present invention, a computer program product includes the same process steps as those of the control method of the embodiment of the present invention.

In accordance with a further embodiment of the present invention, a camera (for example, an image pickup apparatus 50 of FIG. 3) having an image pickup device (for example, a CCD 71 of FIG. 3) capturing an image of a subject, and a driver (for example, an AF driver 51 of FIG. 3) driving an optical element (for example, a focusing lens 61 and a wobbling lens 62 of FIG. 3) to adjust a focus position in the capturing of the image of the subject through the image pickup device, includes a relative angle variation calculating unit (for example, a relative angle variation calculator 121 of FIG. 4) for calculating a relative angle variation, the relative angle variation being a change per unit time of a relative angle of the image pickup device with respect to the subject, a mode change detecting unit (for example, a mode change detector 122 of FIG. 4) for detecting of a change of a mode of the relative angle variation through determining whether the mode of the relative angle variation, calculated by the relative angle variation calculating unit, is a stable mode involving a small amount of change or an unstable mode involving a large amount of change, a focus position control process startup unit (for example, an AF startup command output unit 123 of FIG. 4) for managing a startup of a focus position control process, the focus position control process for controlling the focus position through controlling the driver in response to a pattern of the change of the mode detected by the mode change detecting unit, and a focus position control process executing unit (for example, an AF control processor 83 of FIG. 3) for executing the focus position control process, started by the focus position control process startup unit, the focus position control process controlling the driver to control the focus position.

The embodiments of the present invention are described below with reference to the drawings.

FIG. 3 illustrates an image pickup apparatus 50 in accordance with one embodiment of the present invention.

As shown in FIG. 3, the image pickup apparatus 50 captures an image of a subject, and acquires video data of one of a moving image and a still image of the subject. The image pickup apparatus 50 includes an auto-focus (AF) driver 51, a video processor 52, and an AF controller 53. The image pickup apparatus 50 also records the acquired video data on a recording medium and outputs the video data to the outside. FIG. 3 illustrates only elements in the image pickup apparatus 50 related to embodiments of the present invention.

The AF driver 51 includes a focusing lens 61, a wobbling lens 62, a lens driver 63, a driver controller 64, a sensor 65, and a switch (SW) 66. Under the control of the AF controller 53, the AF driver 51 drives an optical system, thereby performing a focus position adjustment process on light picked up by the video processor 52.

The focusing lens 61, moved along an optical axis direction of light incident on the video processor 52, controls a focus position of the incident light (focus position of a photographed image). The wobbling lens 62 is wobbled slightly along the optical axis direction of the light incident on the video processor 52 in order to move the focus position of the photographed image. The wobbling lens 62 is used to determine the direction of the movement of the focusing lens 61 during a focal adjustment process (focus process). The focusing lens 61 and the wobbling lens 62 may be integrated into a single lens unit (for example, the focusing lens 61 may be operated to wobble as the wobbling lens 62).

In response to control information supplied from the driver controller 64, the lens driver 63 controls the focus position by controlling the focusing lens 61 and the wobbling lens 62 in position and operation (i.e., operates the focusing lens 61 and the wobbling lens 62 to control the focus position). As will be described later, the driver controller 64 is connected to an AF control processor 83 in the AF controller 53 via a serial bus. The driver controller 64 supplies the lens driver 63 with the control information regarding the driving of the focusing lens 61 and the wobbling lens 62 in response to control information including a focus control command and a wobbling control command supplied from the AF control processor 83. The driver controller 64 supplies the control information to the lens driver 63, thereby commanding the lens driver 63 to move the focusing lens 61 in position and cause the wobbling lens 62 to start the wobbling operation.

The driver controller 64 supplies information regarding an iris value and a focus position from the sensor 65 to the AF control processor 83 via the serial bus. The driver controller 64 is controlled in response to the status of a switch (SW) 66. Only when the SW 66 is in an on state, the driver controller 64 performs the control process and a communication process. When the SW 66 is in an off state, the driver controller 64 pauses, performing no process.

The sensor 65 senses the focus position, a zoom position (focal length), and an iris value, and supplies these pieces of measurement information to the AF control processor 83 via the driver controller 64. The SW 66 is operated by a user to determine whether to perform the AF process, and notifies the driver controller 64 of the state of the SW 66.

The video processor 52 generates an electrical video signal in response to the light incident on the image pickup apparatus 50, and includes a charge-coupled device (CCD) 71, an amplifier 72 and a signal processor 73.

The CCD 71 is an image pickup device having photoelectrical conversion elements such as photodiodes. The CCD 71 photoelectrically converts the incident light entering through the focusing lens 61 and the wobbling lens 62, accumulates a charge responsive to a mount of input light, and then drains the charge, thereby resulting in the electrical video signal. The CCD 71 supplies the video signal to the amplifier 72. The amplifier 72 includes a correlated double sampling (CDS) circuit, an automatic gain control (AGC) circuit, and an analog-to-digital (A/D) converter circuit. The amplifier 72 removes reset noise in the video signal supplied from the CCD 71, amplifies the video signal, converts the video signal in analog form to a digital video signal, and then supplies the digital video signal to the signal processor 73.

The signal processor 73 performs an auto exposure (AE) process, an auto white balance (AWB) process and a γ correction process on the supplied video signal, and then supplies the resulting video signal to a subsequent circuit stage while supplying the resulting video signal to an evaluation value calculator 81, and an AF startup controller 82, both in the AF controller 53. The signal processor 73 also supplies the evaluation value calculator 81, and the AF startup controller 82, with control synchronization signals including a horizontal synchronization signal and a vertical synchronization signal of the video signal, and a system clock signal.

In response to the video signal supplied from the video processor 52, the AF controller 53 controls the AF driver 51, thereby performing a control process relating to the control of the AF process. The AF controller 53 includes the evaluation value calculator 81, the AF startup controller 82, and the AF control processor 83.

The evaluation value calculator 81 calculates an evaluation value, evaluating an out-of-focus level of the captured image (video signal) based on the video signal and the synchronization signals supplied from the signal processor 73 in the video processor 52 and setting data supplied from the AF control processor 83. The evaluation value calculator 81 supplies the calculated evaluation value to the AF control processor 83.

In response to the video signal and the synchronization signal, both supplied from the signal processor 73, the AF startup controller 82 performs a control process relating to the startup of the AF process, and then supplies the control result to the AF control processor 83. Under the control of the AF startup controller 82, the AF control processor 83 starts the AF process, executes the AF process in response to the evaluation value supplied from the evaluation value calculator 81, and then supplies control information to the driver controller 64 via the serial bus. The AF control processor 83 generates setting data regarding the calculation of the evaluation value, and then supplies the setting data to the evaluation value calculator 81. The AF control processor 83 retrieves sensor information such as the focus position and the iris value from the driver controller 64 via the serial bus.

The AF controller 53 further includes a bus 90, a read-only memory (ROM) 91, an input unit 92, an output unit 93, a recording unit 94, a communication unit 95, and a drive 96. The AF startup controller 82 is connected to the bus 90. Furthermore, the AF startup controller 82 is connected to the ROM 91 through the drive 96 via the bus 90.

The ROM 91 is a read-only memory, and pre-stores a program to be executed by the AF startup controller 82 and data. The program and data stored on the ROM 91 are read by the AF startup controller 82 via the bus 90 as necessary. The input unit 92, including input devices such as switches and buttons, receives command information input by a user, and supplies the command information to the AF startup controller 82 via the bus 90. The output unit 93 includes a display such as a light-emitting diode (LED), a liquid-crystal display (LCD), an electroluminescent display, or the like, and an audio output device such as a loudspeaker. The output unit 93 displays and outputs information supplied from the AF startup controller 82 via the bus 90.

The recording unit 94, including a hard disk, a semiconductor memory, or the like, stores a program to be executed by the AF startup controller 82 and data. The communication unit 95 includes a modem, a local-area network (LAN) adaptor, a universal serial bus (USB) interface, an institute of electrical and electronic engineers (IEEE) 1394 interface, a small computer system interface (SCSI), IEEE 802.11x adaptor, or the like. The communication unit 95 communicates with another apparatus via a network.

The drive 96 is a read and write processing unit loaded with a removable medium 97, and reads data from and writes data onto the removable medium 97. The removable medium 97 includes a magnetic disk, an optical disk, a magneto-optical disk, a semiconductor memory, or the like. The drive 96 reads programs and data from the loaded removable medium 97, install the read program onto the recording unit 94 and supplies the read program to the AF startup controller 82 as necessary. The drive 96 stores programs and data, retrieved from the AF startup controller 82 via the bus 90, onto the loaded removable medium 97.

When the process of the AF startup controller 82 is performed using software, a program forming the software is installed from a recording medium or via network.

The recording medium storing the program may be the removable medium 97 supplied to the user separately from the body of the apparatus to supply the user with the program. The removable medium 97 may include one of a magnetic disk (including a floppy disk), an optical disk (such as compact-disk read-only memory (CD-ROM), a digital versatile disk (DVD), or the like), a magneto-optical disk (such as Mini-Disk (MO®)), and a semiconductor memory. The recording medium also includes one of the ROM 91 and the recording unit 94 (including one of a hard disk and a semiconductor memory), each of which is supplied in the apparatus body to the user.

The operation of the apparatus is described below.

When a photographing operation is started, the CCD 71 in the video processor 52 photoelectrically converts light entering through the focusing lens 61 and the wobbling lens 62 in the AF driver 51 along the optical axis represented by an arrow-headed broken line 101, thereby resulting in video information (video signal) in an electrical form. The CCD 71 supplies the video signal to the amplifier 72 as represented by an arrow-headed solid line 102. After amplifying the video signal in accordance with a predetermined method, the amplifier 72 supplies a resulting amplified video signal to the signal processor 73 as represented by an arrow-headed solid line 103. The signal processor 73 performs a video process on the supplied video signal and then supplies the processed video signal to a subsequent stage as represented by an arrow-headed solid line 104A while supplying the processed video signal to the evaluation value calculator 81, and the AF startup controller 82, in the AF controller 53 as respectively represented by arrow-headed solid lines 104B and 104C. As represented by arrow-headed solid lines 105A and 105B, the signal processor 73 further supplies the synchronization signal to the evaluation value calculator 81, and the AF startup controller 82, respectively.

Under the control of a program stored on the ROM 91 and the recording unit 94, the AF startup controller 82 performs a control process for starting the AF process (one-shot AF process) based on the video signal (content of a captured image) supplied from the signal processor 73. In response to a luminance value of the video signal, the AF startup controller 82 determines whether to perform the AF process. If a predetermined condition is satisfied, the AF startup controller 82 issues a command to the AF control processor 83 to start the AF process as represented by an arrow-headed solid line 107.

When the command to start the AF process is issued, the AF control processor 83 performs a control process of the AF process together with the evaluation value calculator 81 as represented by an arrow-headed solid line 106.

More specifically, the evaluation value calculator 81 calculates, in accordance with a predetermined calculation method, an evaluation value evaluating the out-of-focus level of a captured image corresponding to the video signal supplied from the signal processor 73, based on setting data supplied from the AF control processor 83 as represented by an arrow-headed solid line 106. The evaluation value indicates the magnitude of contrast in a portion of the image area (evaluation frame) in a frame image, and is calculated based on the sum of high-frequency components of the luminance value in the evaluation frame. Upon having calculated the evaluation value, the evaluation value calculator 81 supplies the evaluation value to the AF control processor 83 as represented by the arrow-headed solid line 106.

The AF control processor 83 commands the driver controller 64 via the serial bus to perform a wobbling operation and a specific operation for the AF process based on an up/down trend determination. The AF control processor 83 receives the evaluation value supplied from the evaluation value calculator 81 as represented by the arrow-headed solid line 106, and sensor information regarding a focus position and an iris value supplied from the driver controller 64 as represented by an arrow-headed solid line 108B, and performs the AF process based on these pieces of information.

The driver controller 64 retrieves the sensor information, such as the focus position and the iris value, from the sensor 65 as represented by an arrow-headed solid line 109, and then supplies the sensor information to the AF control processor 83 via the serial bus as represented by the arrow-headed solid line 108B. The driver controller 64 receives a user command relating to the setting of the AF process from the SW 66 as represented by an arrow-headed solid line 110. In response to the command, the driver controller 64 receives the control information supplied from the AF control processor 83 via the serial bus as represented by an arrow-headed solid line 108A. The driver controller 64 performs a process responsive to the control information. The driver controller 64 supplies, to the lens driver 63, lens drive control information for commanding lens position, etc., as represented by an arrow-headed solid line 111. Based on the lens drive control information, the lens driver 63 drives the focusing lens 61 as represented by an arrow-headed solid line 112, and drives the wobbling lens 62 as represented by an arrow-headed solid line 113.

The image pickup apparatus 50 performs the AF process in this way.

FIG. 4 is a block diagram illustrating in detail the AF startup controller 82 in the AF controller 53.

As shown in FIG. 4, the AF startup controller 82 includes a relative angle variation calculator 121, a mode change detector 122, and an AF startup command output unit 123.

The relative angle variation calculator 121 determines a change per period (unit time) in a relative angle of the image pickup apparatus 50 with respect to a subject (the relative angle being the relationship between the subject and photographing direction). The change is referred to as a relative angle variation p0. The relative angle variation calculator 121 includes an in-field integrated luminance value calculator 131, an area setter 132, a period mean integrated luminance value calculator 133, a period mean integrated luminance value holder 134, a difference calculator 135, and a normalizer 136.

The in-field integrated luminance value calculator 131 integrates (sums) the luminance value (y) of each pixel on a per field image (on a per frame image in the case of a progressive image), and calculates an integrated luminance value (in-field integrated luminance value ynow_w5_f0). The in-field integrated luminance value calculator 131 calculates the integrated luminance value of the pixels in an area set by the area setter 132 as an in-field integrated luminance value. The in-field integrated luminance value calculator 131 supplies the calculated in-field integrated luminance value ynow_w5_f0 to the period mean integrated luminance value calculator 133.

The area setter 132 sets the area over which the in-field integrated luminance value calculator 131 calculates the in-field integrated luminance value ynow_w5_f0. More specifically, the in-field integrated luminance value ynow_w5_f0 is the sum of the luminance values (integrated value) of the pixels within the predetermined area, the predetermined area being whole or part of a photographing frame.

The in-field integrated luminance value ynow_w5_f0 is thus an integrated luminance value per field supplied from the in-field integrated luminance value calculator 131. The period mean integrated luminance value calculator 133 averages the in-field integrated luminance values ynow_w5_f0 by a predetermined time (period) (for example, every N fields (N is a natural number)), thereby resulting in a period mean integrated luminance value yadd_w5_f0. The period mean integrated luminance value yadd_w5_f0 (including an interim calculation result) is supplied to the period mean integrated luminance value holder 134 for storage. Upon calculating one period mean integrated luminance value yadd_w5_f0, the period mean integrated luminance value calculator 133 supplies the value yadd_w5_f0 to the period mean integrated luminance value holder 134 for storage while also supplying the value yadd_w5_f0 to the difference calculator 135.

The period mean integrated luminance value yadd_w5_f0 is the mean value of current in-field integrated luminance values ynow_w5_f0 of the latest period (N fields). More specifically, the period mean integrated luminance value yadd_w5_f0 is the mean value of the in-field integrated luminance values ynow_w5_f0 of the fields from the field N fields before the current field all the way to the current field. The period mean integrated luminance value yadd_w5_f1 of the immediately prior field is the mean of the in-field integrated luminance values ynow_w5_f0 of the field from the field before the current field by N+1 fields to the field before the current field by two fields.

Upon calculating the latest period mean integrated luminance value yadd_w5_f0 (when the mean value of one period is completed), the period mean integrated luminance value holder 134 deletes the period mean integrated luminance value yadd_w5_f1 of the immediately prior field stored heretofore, changes the period mean integrated luminance value yadd_w5_f0 stored heretofore as the period mean integrated luminance value yadd_w5_f1 of the immediately prior field, and stores the latest period mean integrated luminance value yadd_w5_f0. The in-field integrated luminance value ynow_w5_f0 stored on the period mean integrated luminance value holder 134 and the period mean integrated luminance value yadd_w5_f0 in the middle of calculation thereof are updated on a per field basis.

The difference calculator 135 calculates a difference value between the latest period mean integrated luminance value yadd_w5_f0 thus calculated and the period mean integrated luminance value yadd_w5_f1 of the immediately prior field acquired from the period mean integrated luminance value holder 134 (yadd_w5_f0-yadd_w5_f1) and supplies the calculation result and the latest in-field integrated luminance value ynow_w5_f0 to the normalizer 136.

The normalizer 136 normalizes the difference value supplied from the difference calculator 135 using the latest in-field integrated luminance value ynow_w5_f0 and the field count N of one period, and supplies the normalized value, namely, a rate of change of the integrated luminance value as the relative angle variation p0 to a mode determiner 141 in the mode change detector 122.

The relative angle variation p0 is determined using the following equation (1):

$$p0 = \frac{yadd\_w5\_f0 - yadd\_w5\_f1}{ynow\_w5\_f0 \times N} \qquad (1)$$

The mode change detector 122 determines a change in the content of a photographed image, namely, whether a mode of the relative angle variation has changed or not (mode change), based on the relative angle variation p0 calculated by the relative angle variation calculator 121. The mode change detector 122 includes the mode determiner 141, a mode flag 142, a threshold holder 143, an update verifier 144, a mode updater 145, and a mode change pattern determiner 146.

The mode determiner 141 determines the current mode based on the relative angle variation supplied from the normalizer 136 in the relative angle variation calculator 121. The mode herein refers to a class into which the change in the content of the photographed image is categorized according to the degree of change. There are two modes herein, namely, a stable mode and an unstable mode. Depending on the magnitude of the relative angle variation p0, the mode determiner 141 determines whether a subject moves greatly with respect to a photographing angle of the image pickup apparatus 50 (unstable mode) or not (stable mode). By referencing a mode flag 142, the mode determiner 141 identifies the mode of an immediately prior period, and acquires a threshold value corresponding to that mode from the threshold holder 143. The mode determiner 141 determines the mode of the current period from the relative angle variation using the threshold value. The mode determiner 141 supplies, to the update verifier 144, the determination result of mode and the mode of the immediately prior period read from the mode flag 142.

The mode determined by the mode determiner 141 is set in the mode flag 142. More specifically, the mode flag 142 is loaded with information (flag) indicating the stable mode or the unstable mode. The threshold holder 143 holds the threshold values (threshold values α and β set on a per mode basis) used when the mode determiner 141 determines mode. The threshold values held by the threshold holder 143 are values set by the AF startup controller 82.

The update verifier 144 determines, based on the information supplied from the mode determiner 141, whether mode has been updated or not. The update verifier 144 then supplies the mode updater 145 and the mode change pattern determiner 146 with the determination result and the information regarding the mode of the current period determined by the mode determiner 141.

Upon being notified of the mode update by the update verifier 144, the mode updater 145 updates the value of the mode flag 142 to set a value indicating a new mode. If a value indicating the stable mode has been set in the mode flag 142, the mode updater 145 updates the value to a value indicating the unstable mode. If a value indicating the unstable mode has been set in the mode flag 142, the mode updater 145 updates the value to a value indicating the stable mode.

The mode change pattern determiner 146 determines the mode verified by the update verifier 144, namely, a pattern of the mode change. More specifically, the mode change pattern determiner 146 determines whether the mode is shifted from the stable mode to the unstable mode or from the unstable mode to the stable mode, and supplies the determination result to the AF startup command output unit 123.

The AF startup command output unit 123 outputs an AF startup command to the AF control processor 83 based on the determination result of the mode change pattern determiner 146 in the mode change detector 122. More specifically, only when the mode change pattern determiner 146 determines that the mode has shifted from the unstable mode to the stable mode, the AF startup command output unit 123 supplies the AF startup command as the control information to start the AF process to the AF control processor 83.

As described above, the AF startup controller 82 calculates the change in the relative angle of the camera with respect to the subject as a parameter for controlling the startup of the AF process of the relative angle variation calculator 121. The mode change detector 122 detects the pattern of the change in the mode change. The AF startup command output unit 123 outputs the startup command of the AF process to the AF control processor 83 in response to the mode change pattern.

Figure 5:
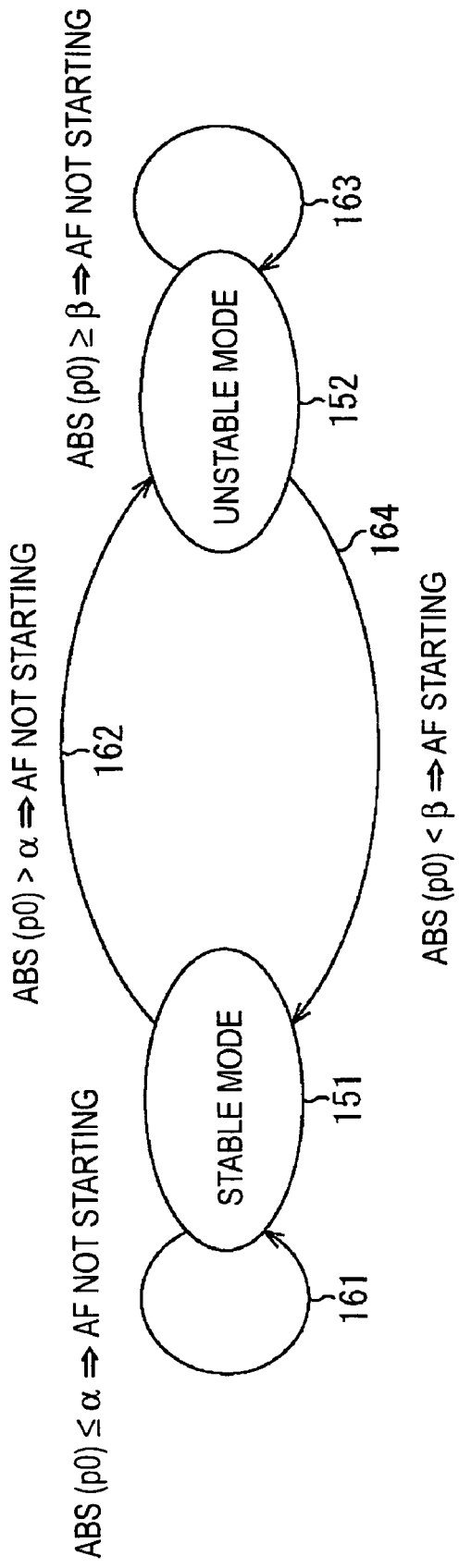
FIG. 5 diagrammatically illustrates a mode shifting determination and an AF process.

FIG. 5 diagrammatically illustrates the relationship between the mode shift determination and AF startup.

As shown in FIG. 5, modes of movement in the photographing angle of the image pickup apparatus 50 with respect to the subject (relative angle variation) include two modes, namely, a stable mode 151 and an unstable mode 152.

Let an immediately preceding mode be the stable mode 151. In such a case, the value indicating the stable mode 151 is set in the mode flag 142. The mode determiner 141 references the mode flag 142. When the mode determiner 141 determines that the mode is the stable mode 151, the mode determiner 141 retrieves the threshold value $\alpha$ for the stable mode from the threshold holder 143. The mode determiner 141 compares the absolute value ABS p(0) of the relative angle variation supplied from the normalizer 136 in the relative angle variation calculator 121 (normalized difference value) with the threshold value $\alpha$. If the absolute value of the relative angle variation is smaller than the threshold value $\alpha$, the mode determiner 141 determines that the mode in a new period is the stable mode 151. Since the mode is the stable mode 151 in both the immediately preceding period and the current period, no mode change takes place as represented by an arrow-headed curved line 161.

If the absolute value ABS (p0) of the relative angle variation is greater than the threshold value $\alpha$, the mode determiner 141 determines that the mode in the new period is the unstable mode 152. More specifically, as a result of mode change, the mode has been shifted from the stable mode 151 in the immediately preceding period to the unstable mode 152 in the current period as represented by an arrow-headed curved line 162. The update verifier 144 verifies that the mode has shifted from the stable mode 151 to the unstable mode 152 as represented by the arrow-headed curved line 162, and the mode updater 145 updates the value in the mode flag 142.

Since the value indicative of the unstable mode 152 is set in the mode flag 142, the mode determiner 141 references the mode flag 142 to determine that the mode is the unstable mode 152. The mode determiner 141 then retrieves the threshold value $\beta$ for the unstable mode from the threshold holder 143. The mode determiner 141 compares the absolute value ABS (p0) of the relative angle variation supplied from the normalizer 136 in the relative angle variation calculator 121 (normalized difference value) with the threshold value $\beta$. If the absolute value ABS (p0) of the relative angle variation is equal to or above the threshold value $\beta$, the mode determiner 141 determines that the mode in the new period is also the unstable mode 152. Since the modes in the immediately prior period and the current period are the unstable mode 152, no mode change takes place as represented by an arrow-headed curved line 163.

If the absolute value ABS (p0) of the relative angle variation is smaller than the threshold value $\beta$, the mode determiner 141 determines that the mode in the new period is the stable mode 151. More specifically, as a result of mode change, the mode has been shifted from the unstable mode 152 in the immediately preceding period to the stable mode 151 in the current period. The update verifier 144 verifies that the mode transition pattern is a shift from the unstable mode 152 to the stable mode 151 as represented by an arrow-headed curved line 164. The mode updater 145 then updates the value of the mode flag 142.

When the mode is shifted as one of arrow-headed curved lines 162 and 164, the mode change pattern determiner 146 determines the shift direction (mode change pattern). Based on the determination result, the AF startup command output unit 123 outputs the AF process start command to the AF control processor 83 only when the mode has been shifted from the unstable mode 152 to the stable mode 151 as represented by the arrow-headed curved line 164.

More specifically, if the absolute value ABS (p0) of the relative angle variation $\leq \alpha$ (as represented by the arrow-headed curved line 161), the absolute value ABS (p0) $>\alpha$ (as represented by the arrow-headed curved line 162) or the absolute value ABS (p0) $\geq \beta$ (as represented by the arrow-headed curved line 163), the AF process is not started. Only if the absolute value ABS (p0) $<\beta$ (as represented by the arrow-headed curved line 164), the AF process is started. More specifically, if the mode of the relative angle variation has been shifted from the unstable mode 152 to the stable mode 151 (if the change in the relative angle becomes gradually stabilized after a fluctuation period within which the relative angle greatly fluctuates), the AF process is started.

As an example of AF startup control process, a panning operation of the image pickup apparatus 50 is described below with reference to FIGS. 6A and 6B.

Figure 6A:
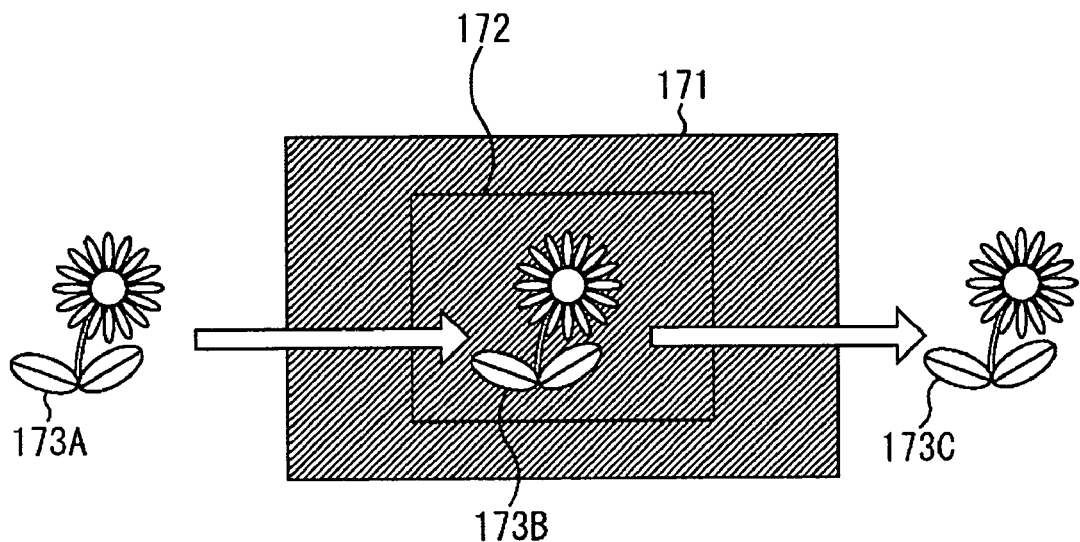
FIGS. 6A and 6B illustrate one example of AF startup control process of the image pickup apparatus of FIG. 3.

As shown in FIG. 6A, the image pickup apparatus 50 is panned from right to left (in the photographing direction) to photograph a subject. The subject, which was not present as a subject 173A in a photographed image to the left of a photographing frame 171, enters the photographing frame 171 as a subject 173B, and then leaves the photographing frame 171 from the left side thereof as a subject 173C.

An evaluation frame 172, smaller than the photographing frame 171, is arranged in the center of the photographing frame 171. The evaluation value of the photographed image is calculated within the evaluation frame 172 while the in-field integrated luminance value is calculated within the entire photographing frame 171.

When the subject enters and leaves the evaluation frame 172 (as the subject 173B), the evaluation value changes greatly. When the AF process is started in response to a change in the evaluation value, an attempt is made to focus on the subject that finally leaves the photographing frame 171. When a focus position is shifted, the subject is not present within the photographing frame 171, leading to an out-of-focus image. When the evaluation value becomes stabilized after the panning operation ends, the AF process is not started, and the photographed image remains in an out-of-focus state.

Figure 6B:
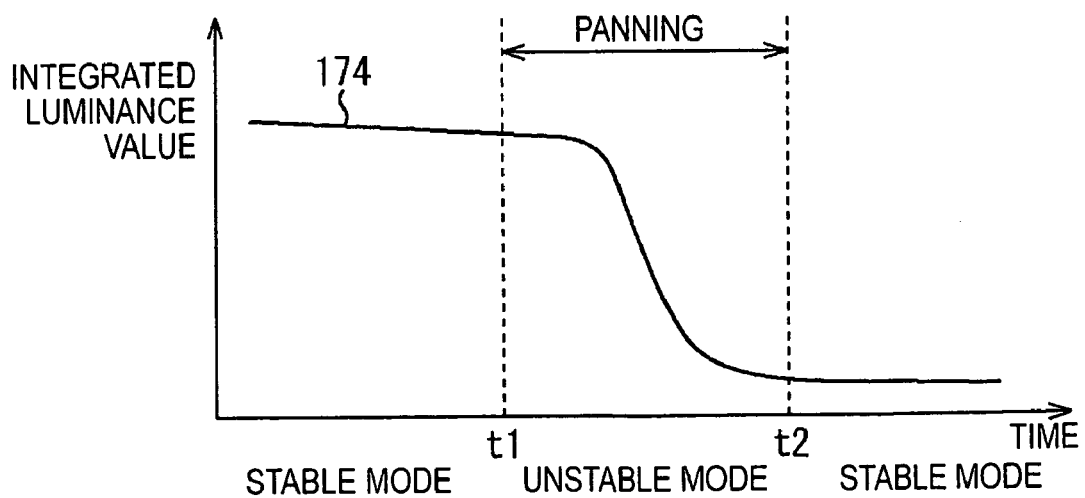

The in-field integrated luminance value changes as plotted by a curve 174 of FIG. 6B when the image pickup apparatus 50 pans as shown in FIG. 6A. As shown in FIG. 6B, the abscissa represents time while the ordinate represents the in-field integrated luminance value. For example, when the image pickup apparatus 50 pans from time t1 to time t2 as shown in FIG. 6A, the in-field integrated luminance value remaining stable up to time t1 greatly changes within time length from time t1 to time t2. From time t2 thereafter, namely, from the end of the panning operation thereafter, the in-field integrated luminance value becomes again stabilized. More specifically, the image pickup apparatus 50, being stabled before time t1, was shifted to the unstable mode at time t1, and is then shifted back to the stable mode at time t2.

When the AF startup controller 82 controls the AF startup control using the in-field integrated luminance value (the absolute value ABS (p0) of the relative angle variation calculated from the in-field integrated luminance value), the AF process is performed only at time t2 (at the shifting timing from the unstable mode to the stable mode). More specifically, the relative angle variation as a dedicated parameter rather than the evaluation value as a parameter controlling the focus position is used in the startup control for the AF process. The image pickup apparatus 50 (AF startup controller 82) easily reduces unnecessary portion of the AF process, thereby achieving a stable AF process. The image pickup apparatus 50 performs the AF startup control process in this way, thereby controlling unnecessary focusing operation to the subject (subject 173B) during panning. The image pickup apparatus 50 controls the out-of-focus image. The same is true of the tilting operation.

In the AF startup controller 82, as described above, the relative angle variation calculator 121 calculates the change in the relative angle of the camera with respect to the subject as the parameter for controlling the AF process startup, the mode change detector 122 detects the mode change pattern of the change, and the AF startup command output unit 123 outputs the startup command of the AF process to the AF control processor 83 based on the mode change pattern.

As another example, the AF startup control with a subject swinging within the photographing frame 171 is described below.

Figure 7A:
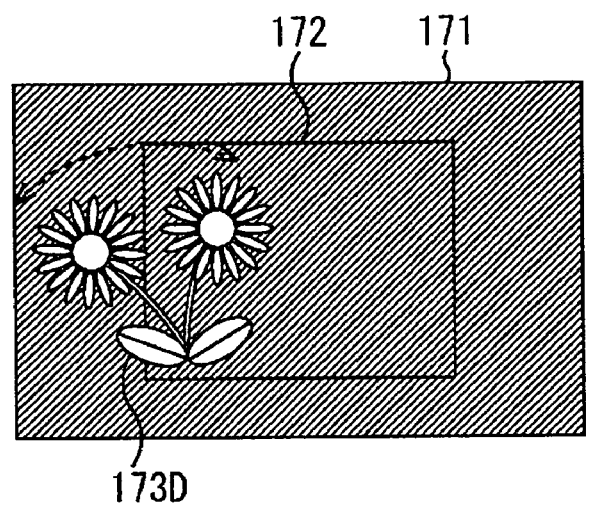
FIGS. 7A and 7B illustrate another example of AF startup process of the image pickup apparatus of FIG. 3.

As shown in FIG. 7A, the subject 173D swings, thereby repeatedly entering and leaving the evaluation frame 172 in the photographing frame 171. In this case, the evaluation value substantially changes. If the AF process is started in response to the change in the evaluation value, the AF process is continuously performed while the subject 173D is swinging. If the AF process is performed, the focus position of the photographed image changes due to the wobbling operation. More specifically, when the subject 193D swings, the focus position of the photographed image continuously changes, causing a viewer to feel odd at the image. Particularly when the photographed image is a high-quality and high-definition image, the viewer can view a fine change in the focus position because of high definition. The viewer thus feels more odd at an unwanted change in the focus position.

Figure 7B:
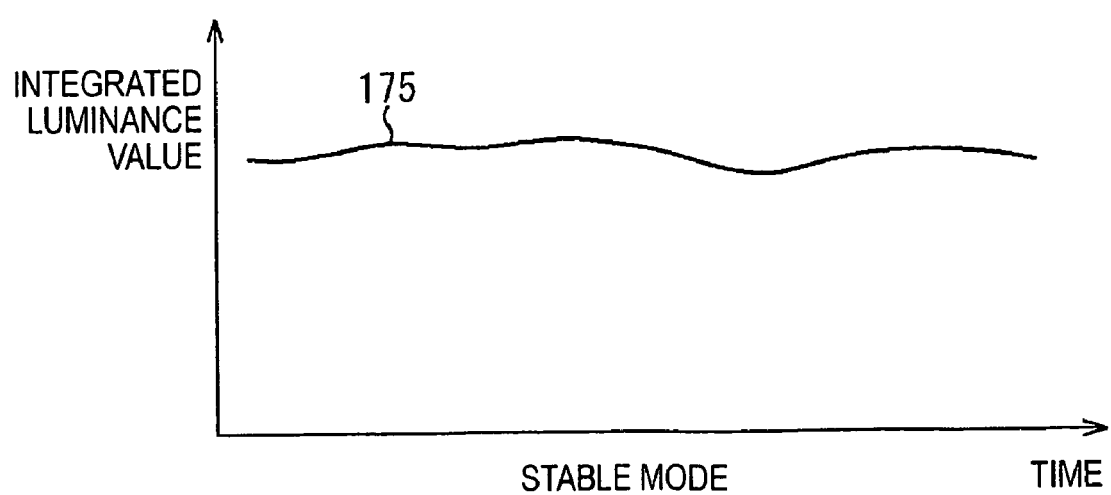

In contrast, the in-field integrated luminance value is calculated over the entire photographing frame 171. Even if the subject 173D swings as shown in FIG. 7A, a curve 175 of FIG. 7B does not change so much as the curve 174 of FIG. 6B. In FIG. 7B, the abscissa represents time and the ordinate represents the in-field integrated luminance value. Even the subject 173D swings within the photographing frame 171, the sum (integrated value) of the luminance values within the entire photographing frame 171 does not change so much. In this case, the mode of the relative angle variation is always a stable mode.

When the AF startup controller 82 performs the AF startup control process using the above-referenced in-field integrated luminance value (the absolute value ABS (p0) of the relative angle variation calculated from the in-field integrated luminance value), no AF process is started. More specifically, the image pickup apparatus 50 controls fine focusing operation focusing on an unnecessary subject (subject 173D), thereby stabilizing the focus position of the photographed image. The generation of the odd image as a result of unnecessary change in the focus position is thus controlled.

As shown in FIGS. 6A, 6B, 7A, and 7B, the in-field integrated luminance value for use in the control of the AF process startup is calculated over the entire photographing frame 171. The evaluation value for use in the control of the focus position is calculated over the evaluation frame 192 being part of the photographing frame 171. Generally speaking, the smaller the evaluation frame 172, the easier the user identifies the subject within the evaluation frame 172, and the easier the focus position is controlled. By calculating these values, the user can easily control the focus position in the image pickup apparatus 50. The image pickup apparatus 50 restricts the unnecessary AF process, thereby stabilizing the focus position and performing an appropriate AF startup control.

The area of the calculation of the in-field integrated luminance value may be part of the photographing frame 171 at any location within the photographing frame 171. A plurality of areas (over which the in-field integrated luminance value is calculated) can be set up within the photographing frame 171. The plurality of areas can partly overlap each other, and one area may contain another entire area therewithin among the plurality of areas.

The same is true of the evaluation frame 172. The evaluation frame 172 can be arranged at any location within the photographing frame 171. The entire photographing frame 171 can be set up as the evaluation frame 172. A plurality of evaluation frames 172 can be arranged in the photographing frame 171. The plurality of evaluation frames 172 can partly overlap each other, and one evaluation frame 172 can contain another entire evaluation frame 172 therewithin.

The setting of the area of the calculation of the in-field integrated luminance value is, in principle, independent of the setting of the evaluation frame 172. As previously discussed, the evaluation frame 172 is preferably smaller, and the area of the calculation of the in-field integrated luminance value is preferably larger in order to stabilize the focus position (not to respond to the swinging motion of the subject, for example).

If the area of the calculation of the in-field integrated luminance value does not overlap the evaluation frame 172, the in-field integrated luminance value and the evaluation value are respectively affected by mutually different subjects. Since the startup of the AF process is typically controlled based on the movement of a subject on which the user focuses on, the area of the calculation of the in-field integrated luminance value preferably contains the evaluation frame 172. It is perfectly acceptable if the area of the calculation of the in-field integrated luminance value is intentionally set to be clear of the evaluation frame 172. In that case, the AF startup control is performed based on a change in the luminance value in response to the movement of a subject different from a subject on which the user currently focuses.

For example, when illumination is turned on or off during the photographing the illumination, the luminance value changes. In such a case, the AF process can be started even if the subject (illumination) remains stationary. When the subject (illumination) covers half the area of the photographing frame 171 as in wide-end photographing, the area of the calculation of the in-field integrated luminance value is set up in a portion of the photographing frame 171 where no subject (no illumination) is photographed (i.e., set up in a portion not overlapping the evaluation frame 172). In this way, the image pickup apparatus 50 performs the AF startup control in a manner free from the effect of the switch on/off of the illumination, thereby reducing the unnecessary AF process. The focus position of the photographed image is thus stabilized.

The area of the calculation of the in-field integrated luminance value may be predetermined or set to be at any location within the photographing frame 171 by the user during pre-photographing session or photographing session. In this case, the size and shape of the area of the calculation of the in-field integrated luminance value may be left to the responsibility of the user for setting. Furthermore, a plurality of area candidates of the calculation of the in-field integrated luminance value can be prepared and the user can select and set any one from among the plurality of candidates during the pre-photographing session or the photographing session, as the area of the calculation of the in-field integrated luminance value. The same is true of the evaluation frame 172. The evaluation frame 172 can be a predetermined one or set flexibly by the user during the pre-photographing session or the photographing session.

If the area of the calculation of the in-field integrated luminance value and the evaluation frame 172 are predetermined, the user can photograph in a manner freed from such setting during the photographing session. If the user is permitted to flexibly set the area of the calculation of the in-field integrated luminance value and the evaluation frame 172, the user can set the area matching environment and photographing conditions of the subject. The image pickup apparatus 50 thus performs an appropriate AF process as the user intends. Furthermore, the user can easily set the area by simply selecting the area.

As a method of setting the area of the calculation of the in-field integrated luminance value, the user may set an area over which the in-field integrated luminance value is not calculated. In this case, the image pickup apparatus 50 integrates the luminance value over an area other than the area specified by the user to calculate the in-field integrated luminance value, and performs the AF startup control using the resulting in-field integrated luminance value.

The above-described processes are detailed below. The AF startup control process of the AF startup controller 82 is described below with reference to a flowchart of FIG. 8.

Upon being supplied with the video signal (such as a field image or a frame image) by the signal processor 73, the relative angle variation calculator 121 in the AF startup controller 82 executes a relative angle variation calculation process in step S1. The relative angle variation calculation process will be described later with reference to a flowchart of FIG. 9.

Upon completing the relative angle variation calculation process, the mode change detector 122 executes a mode change detection process in step S2. The mode change detection process will be described with reference to a flowchart of FIG. 10.

Upon completing the mode change detection process, the AF startup command output unit 123 determines in step S3 whether to start the AF process based on the mode change detection process. When the mode of the relative angle variation is determined as described above as being shifted from the unstable mode 152 to the stable mode 151, and the AF process is determined as being started, the AF startup command output unit 123 outputs the AF startup command to the AF control processor 83 in step S4. After starting the AF process, the AF startup command output unit 123 completes the AF control process. If it is determined in step S3 that the mode of the relative angle variation has not been shifted from the unstable mode 152 to the stable mode 151, and that the AF process remains to be started, the AF startup command output unit 123 skips step S4, thereby ending the AF startup control process.

Figure 8:
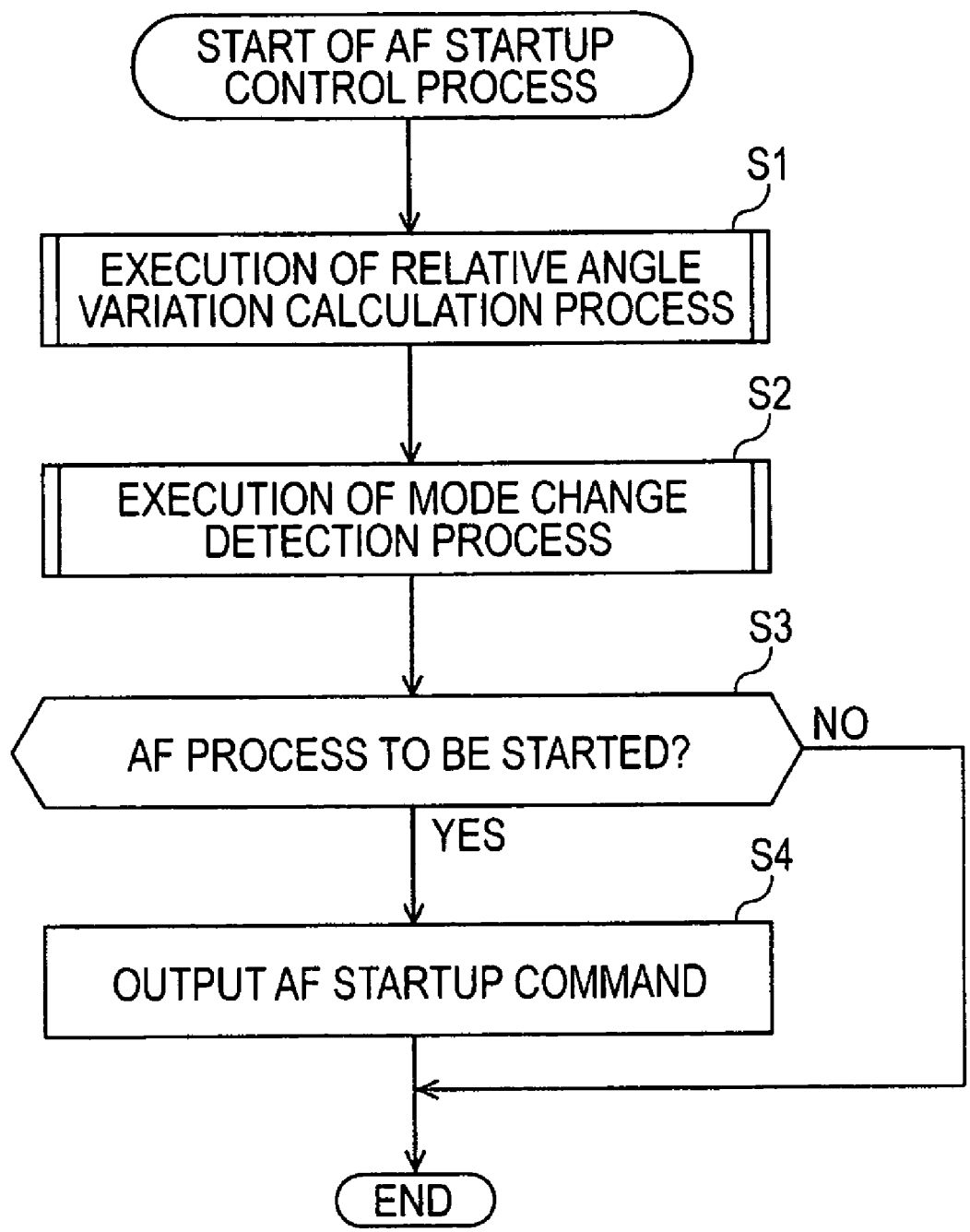
FIG. 8 is a flowchart illustrating an AF startup control process.
Figure 9:
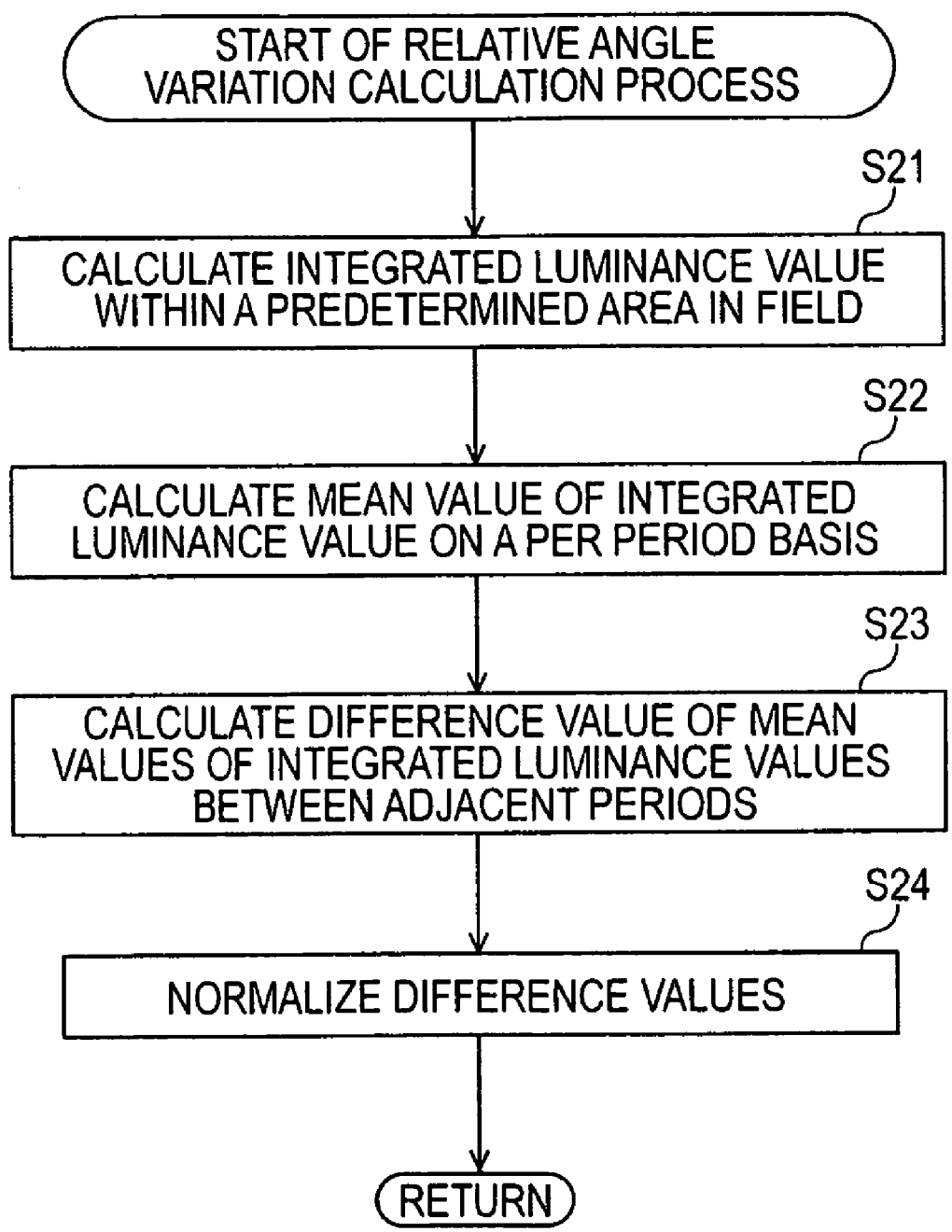
FIG. 9 is a flowchart illustrating a relative angle variation calculation process.

The relative angle variation calculation process to be executed in step S1 of FIG. 8 is described below with reference to the flowchart of FIG. 9.

When the relative angle variation calculation process starts with the video signal supplied by the signal processor 73, the in-field integrated luminance value calculator 131 calculates in step S21 the integral value of the luminance values (in-field integrated luminance value) in a predetermined area in a field (the predetermined area being set up by the area setter 132 in the photographing frame) based on the supplied video signal.

In step S22, the period mean integrated luminance value calculator 133 calculates the mean value of the integrated luminance values in each period (period mean integrated luminance value) in cooperation with the period mean integrated luminance value holder 134. In step S23, the difference calculator 135 calculates the difference value of the period mean integrated luminance value of adjacent periods (the latest period and the immediately prior period). In step S24, the normalizer 136 normalizes the difference value, calculated in step S23, with the latest in-field integrated luminance value and the field count, thereby determining the relative angle variation. Subsequent to step S24, the normalizer 136 completes the relative angle variation calculation process, and returns to step S1 of FIG. 8 to perform step S2 and subsequent steps.

The mode change detection process to be executed in step S2 of FIG. 8 is described below with reference to the flowchart of FIG. 10.

When the mode change detection process starts, the mode determiner 141 compares in step S41 the relative angle variation as the normalized difference value with the threshold value corresponding to the mode in the immediately prior period obtained by referencing the mode flag 142 and the threshold holder 143 (threshold value selected and set by the AF startup controller 82). In step S42, the mode determiner 141 determines the latest mode. In step S43, the update verifier 144 determines whether the mode has changed. If the update verifier 144 determines that the mode has changed, processing proceeds to step S44. In step S44, the mode updater 145 updates the value in the mode flag 142. The mode change pattern determiner 146 determines the mode change pattern in step S45, and outputs the mode determination result to the AF startup command output unit 123 in step S46. The mode change pattern determiner 146 completes the mode change detection process, and then returns to step S2 of FIG. 8. The AF startup controller 82 performs step S3 and subsequent steps.

If it is determined in step S43 that the mode has not changed, the update verifier 144 completes the mode change detection process skipping steps S44 through S46, and then returns to step S2 of FIG. 8. The AF startup controller 82 performs step S3 and subsequent steps.

With the above-referenced steps performed, the AF startup controller 82 easily reduces the AF process, and achieves a more precise AF process, thereby resulting in a high-quality image.

In the above discussion, the change in the relative angle of the camera with respect to the subject, as a parameter for controlling the AF process startup, is based on the luminance value of the photographed image. The parameter is not limited to the luminance value. The parameter can be calculated using a value other than the luminance value, such as a value regarding contrast. Calculation method is not limited to the one described above. In the above discussion, the mean value of the in-field integrated luminance value is calculated on each period, and the relative angle variation is calculated using the mean value. Alternatively, instead of the integrated luminance value, the mean value of the luminance values can be used. Instead of the mean value of the in-field integrated luminance value on each period, the sum of the in-field integrated luminance values can be used to calculate the relative angle variation. The mean values of the luminance values determined on a field by field basis are averaged on a per period basis to calculate the relative angle variation. The normalization operation can be performed using another value such as mean integrated luminance value on a per period basis, instead of the latest in-field luminance values and the field count. Even the entire normalization operation can be omitted.

A value other than the change in the relative angle of the camera with respect to the subject can be used as a parameter for controlling the AF process startup. Another value other than the change in the relative angle of the camera with respect to the subject can be used together with the change in the relative angle of the camera with respect to the subject.

Figure 11:
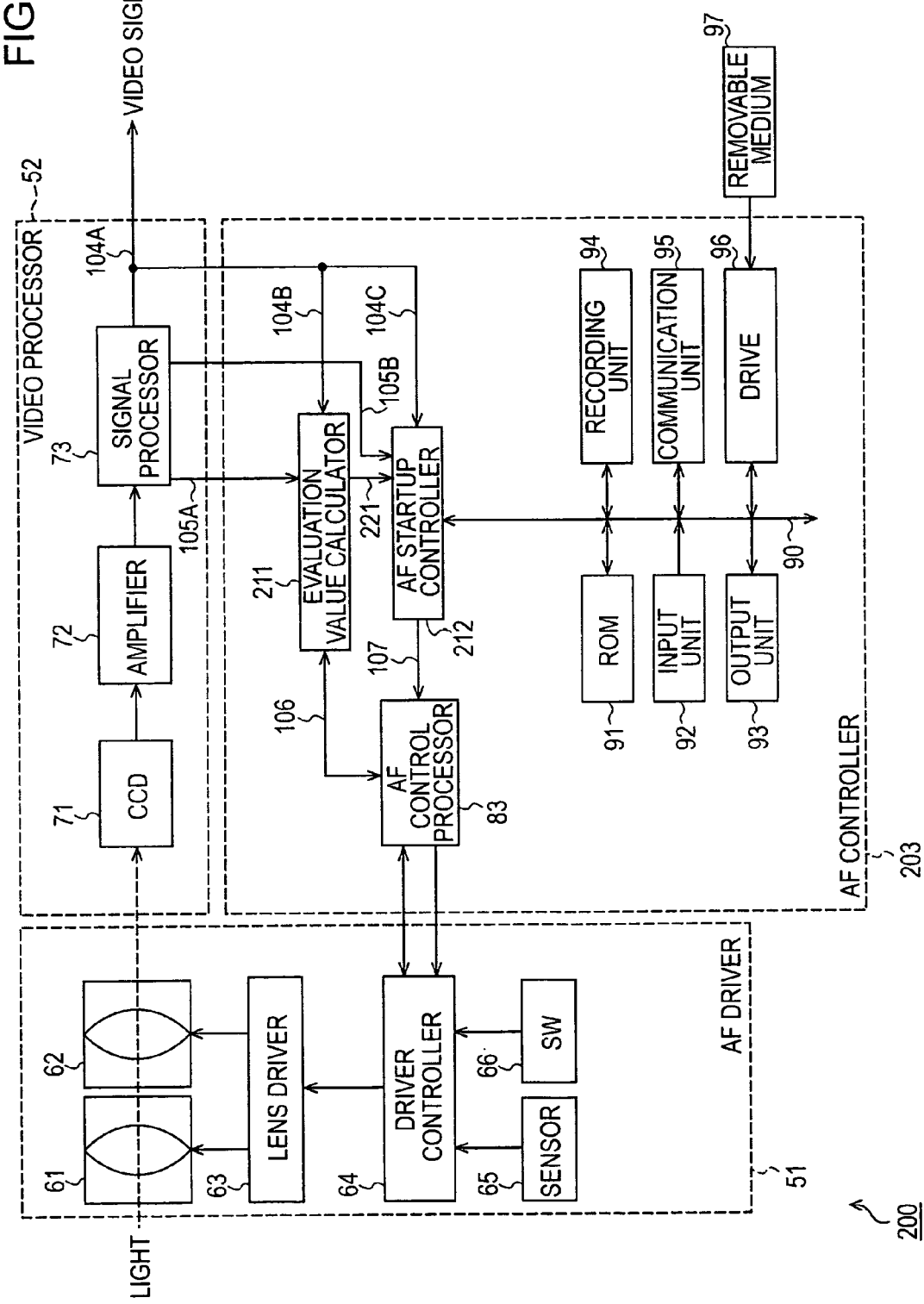
FIG. 11 illustrates the structure of an image pickup apparatus in accordance with another embodiment of the present invention.

FIG. 11 illustrates an image pickup apparatus 200 in accordance with another embodiment of the present invention. The image pickup apparatus 200 of FIG. 11, corresponding to the image pickup apparatus 50 of FIG. 3, is generally identical in structure to the image pickup apparatus 50. However, an AF startup controller 212 in the image pickup apparatus 200, is different from the AF startup controller 82 in the image pickup apparatus 50, acquires not only the video signal supplied from the signal processor 73 but also the evaluation value calculated by an evaluation value calculator 211. The AF startup controller 212 performs the AF startup control process driven by the evaluation value in combination with the AF startup control process driven by the luminance value of the video signal.

Instead of the AF controller 53 in the image pickup apparatus 50 of FIG. 3, the image pickup apparatus 200 contains an AF controller 203. The AF controller 53 contains the evaluation value calculator 81 and the AF startup controller 82 in the AF controller 53 while the AF controller 203 contains the evaluation value calculator 211 and the AF startup controller 212.

Unlike the evaluation value calculator 81 of FIG. 3, the evaluation value calculator 211 supplies the calculated evaluation value not only to the AF control processor 83, but also to the AF startup controller 212 (as represented by an arrow-headed solid line 221). The AF startup controller 212 perform not only the AF startup control driven by the luminance value of the video signal supplied by the signal processor 73 (as represented by an arrow-headed solid line 104C) but also the AF startup control driven by the evaluation value. Even if the relative angle variation is in a stable mode, the AF process is started in response to an evaluation value if the evaluation value is large.

FIG. 12 is a block diagram illustrating in detail the AF startup controller 212 of FIG. 11. As shown in FIG. 12, the AF startup controller 212 includes a relative angle variation calculator 121, a mode change detector 122, an AF startup command output unit 123, and an evaluation value change detector 231.

The evaluation value change detector 231 for detecting a change in the evaluation value in the AF startup control includes an evaluation value adder 241, a reference additional result holder 242, an evaluation value variation rate calculator 243, and an evaluation value variation rate determiner 244.

The evaluation value adder 241 stores the evaluation value of the latest M fields (M is an natural number), and calculates the sum of the evaluation values (hadd_w1_f1). If the number of evaluation values stored (number of fields) is yet to reach M (M fields), the evaluation value adder 241 stores a new evaluation value supplied from the evaluation value calculator 211, and adds the new evaluation value to the stored interim sum (in the middle of summing). If the evaluation value adder 241 already holds the evaluation value of M fields and the sum result hadd_w1_f1, the evaluation value adder 241 deletes the oldest evaluation value from among the stored M evaluation values (of the M fields), and subtracts the value of the deleted oldest evaluation value from the sum result hadd_w1_f1, stores the evaluation value supplied from the evaluation value calculator 211, adds that evaluation value to the stored sum (sum of the evaluation values of M−1), and calculates the sum result hadd_w1_f1 of the latest M fields.

As a reference sum result hadd_w1_f0, the reference additional result holder 242 stores the sum result hadd_w1_f1 of the M frames that is stored onto the evaluation value adder 241 immediately subsequent to stabilization (immediately subsequent to a shifting from the unstable mode to the stable mode). More specifically, if it is determined that the AF startup command output unit 123 outputs an AF startup command (i.e., the mode has been shifted from the unstable mode to the stable mode), the reference additional result holder 242 stores the sum result hadd_w1_f1 as the reference sum result hadd_w1_f0. If an existing reference sum result hadd_w1_f0 is already stored, the reference additional result holder 242 deletes that reference sum result hadd_w1_f0, and then stores the sum result hadd_w1_f1 from the evaluation value adder 241 as the reference sum result hadd_w1_f0.

If the value in the mode flag 142 in the mode change detector 122 indicates a stable mode, the evaluation value variation rate calculator 243 calculates an evaluation value variation rate q0, representing the magnitude of variation of the evaluation value, in accordance with equation (2), using the sum result hadd_w1_f1 held by the evaluation value adder 241 and the reference sum result hadd_w1_f0 held by the reference additional result holder 242, and supplies the evaluation value variation rate q0 to the evaluation value variation rate determiner 244:

$$q0 = \frac{hadd\_w5\_f1}{hadd\_w5\_f0} \qquad (2)$$

The evaluation value variation rate determiner 244 determines whether to perform the AF process based on the supplied evaluation value variation rate q0, and outputs the determination result to the AF startup command output unit 123. For example, the evaluation value variation rate determiner 244 compares the supplied evaluation value variation rate q0 with a threshold value γ (γ is a natural number) or 1/γ. The evaluation value variation rate determiner 244 determines to perform the AF process if the condition represented by the following equation (3) is satisfied, and determines not to perform the AF process if the condition represented by the following equation (3) is not satisfied:

$$q0 < \frac{1}{\gamma} \text{ or } \gamma < q0 \qquad (3)$$

The evaluation value variation rate determiner 244 also supplies the determination result to the AF startup command output unit 123. The AF startup command output unit 123 supplies a startup command to start the AF process to the AF control processor 83 based on the determination result of the mode change pattern provided by the mode change detector 122 and the determination result provided by the evaluation value variation rate determiner 244.

By using the evaluation value-driven AF startup control in combination, the image pickup apparatus 200 correctly performs the AF startup control on the movement of the subject that does not influence so much on the in-field integrated luminance value.

A specific example of the AF startup control of the image pickup apparatus 200 is described below with reference to FIGS. 13A and 13B. The image pickup apparatus 200 photographs an approaching subject.

Figure 13A:
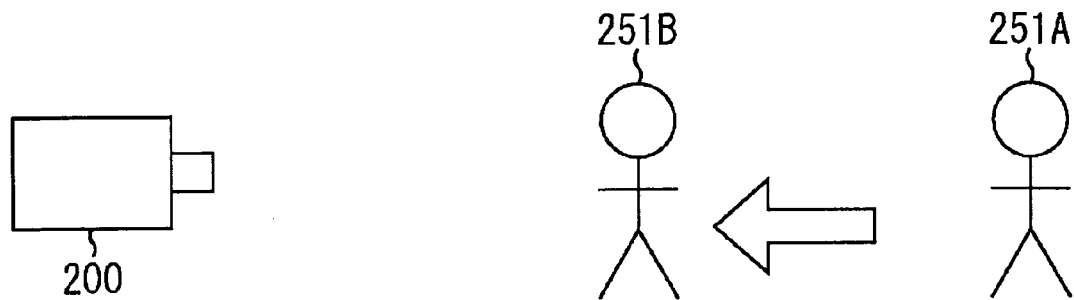
FIGS. 13A and 13B illustrate an AF startup control process of the image pickup apparatus of FIG. 11.
Figure 13B:
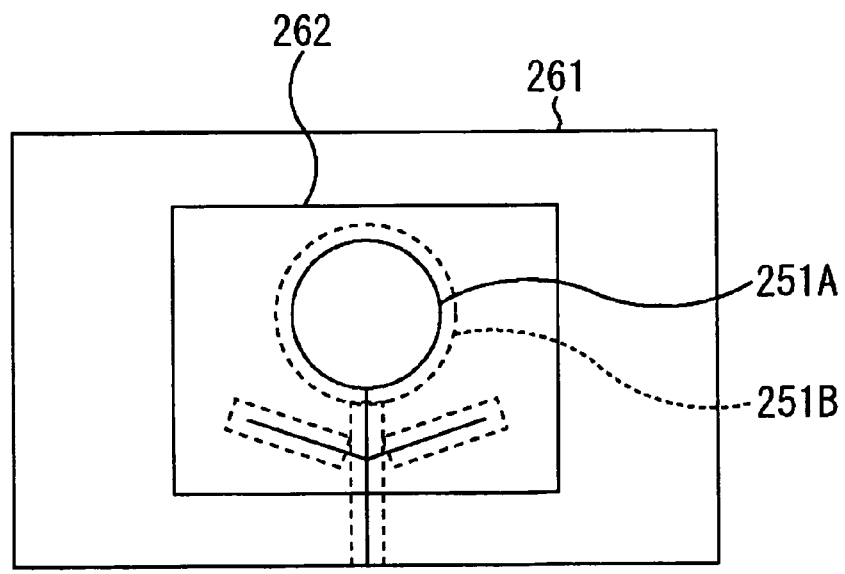

When the subject is approaching the image pickup apparatus 200 (namely, the subject is changing from subject 251A to subject 251B) as shown in FIG. 13A, the photographed image changes as shown in FIG. 13B. The subject 251A (represented by a solid outline), photographed in the center of the photographed image, changes to the subject 251B, which appears slightly larger than the subject 251A (as represented a broken outline). The integral of the luminance values is calculated over an entire photographing frame 261. In the change shown FIG. 13B, there occurs no large change in the occupancy ratio of the subject 251A to the photographing frame 261 and the occupancy ratio of the subject 251B to the photographing frame 261, and the in-field integrated luminance value does not change so much. Although the subject becomes out of focus with the range from the image pickup apparatus 200 to the subject changing, the relative angle variation remains small, and the mode remains at the stable mode. The AF process is not started, i.e., the photographed image remains out of focus.

In contrast to such an in-field integrated luminance value, the evaluation value changes greatly in response to the motion of the subject because contrast drops with the subject off the in-focus position. The image pickup apparatus 200 performs the AF startup control using the in-field integrated luminance value while monitoring the change in the evaluation value. Even if the relative angle variation is in the stable mode, the image pickup apparatus 200 determines, in response to a high variation rate of the evaluation value, that the subject is approaching as shown in FIG. 13A, and thus starts the AF process.

The image pickup apparatus 200 performs, in combination, the AF startup control driven by the evaluation value, thereby prevents an out-of-focus image from being captured as a result of unstarted AF process. The image pickup apparatus 200 thus allows a user to easily control focus position, thereby leading to a reliable AF startup control.

The AF startup control process is described below with reference to a flowchart of FIG. 14. The flowchart of FIG. 14 corresponds to the flowchart of FIG. 8.

When the AF startup control process is started, the relative angle variation calculator 121 in the AF startup controller 212 performs the relative angle variation calculation process in step S61. The relative angle variation calculation process remains identical to that discussed with reference to FIG. 9, and the discussion thereof is omitted herein.

In step S62, the mode change detector 122 executes the mode change detection process. The mode change detection process is identical to that discussed with reference to FIG. 10, and the discussion thereof is omitted herein.

In step S63, the evaluation value change detector 231 performs an evaluation value change detection process. The evaluation value change detection process will be described in more detail later.

In step S64, the AF startup command output unit 123 determines whether to start the AF process, based on the mode determination result supplied from the mode change detector 122, and the determination result supplied from the evaluation value change detector 231. If the starting of the AF process is determined, the AF startup command output unit 123 proceeds to step S65 to output the AF startup command to the AF control processor 83, and completes the AF startup control process. If the AF startup command output unit 123 determines not to start the AF process, the AF startup command output unit 123 ends the AF startup control process skipping step S65.

Figure 14:
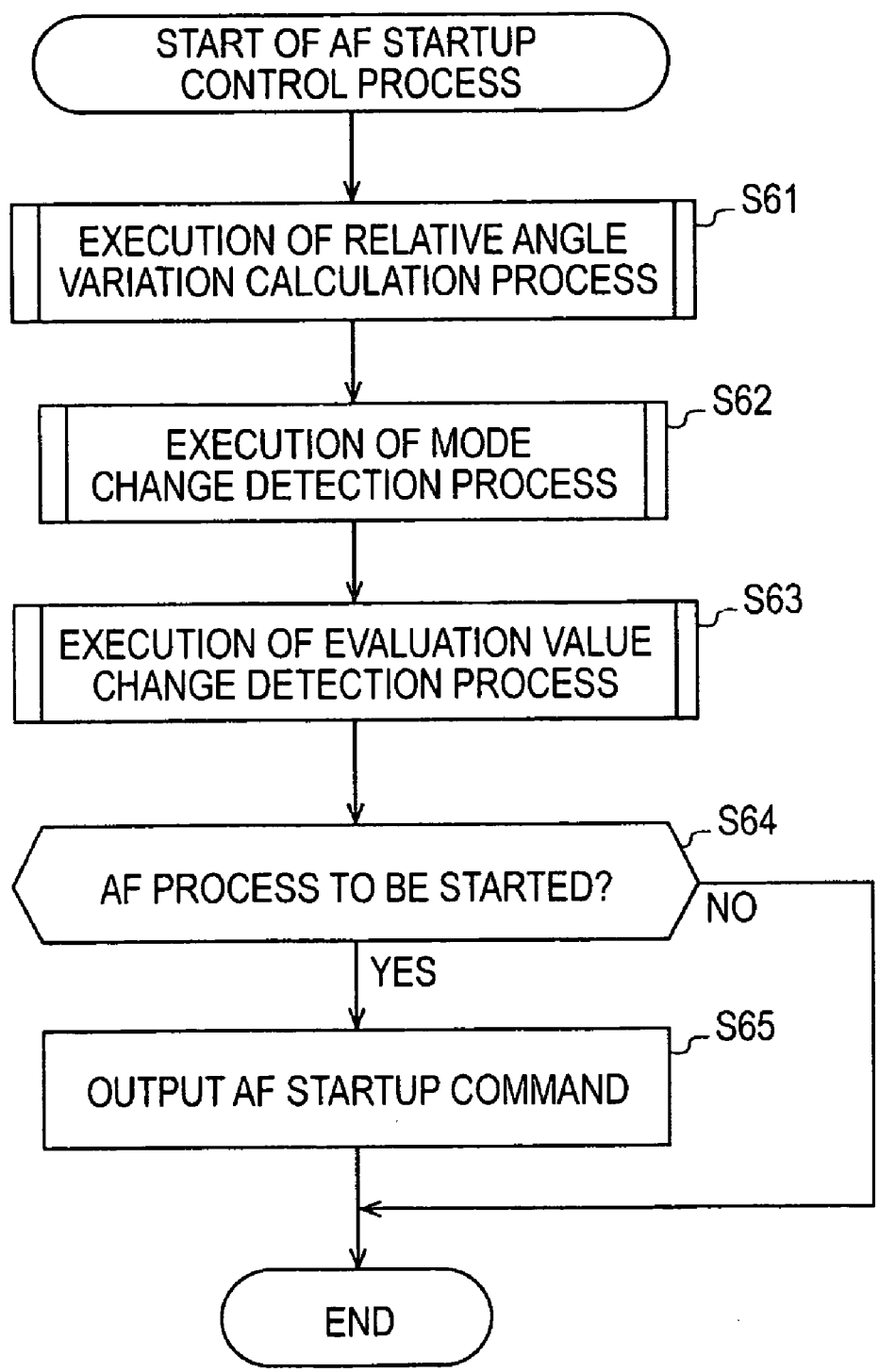
FIG. 14 is a flowchart illustrating an AF startup control process.

The AF startup control process to be executed in step S63 of FIG. 14 is described below with reference to a flowchart of FIG. 15.

When the AF startup control process is started, the evaluation value adder 241 determines in step S81 whether the evaluation values of one period (M evaluation values) are stored. If it is determined that the M evaluation values are stored, processing proceeds to step S82. The oldest evaluation value is deleted from the latest sum result hadd_w1_f1. Processing proceeds to step S83 to add the newest evaluation value to the latest sum. If it is determined in step S81 that the evaluation values of one period are not stored, the evaluation value adder 241 proceeds to step S83 with step S82 skipped. The evaluation value adder 241 then adds the newest evaluation value to the latest sum.

In step S84, the reference additional result holder 242 acquires information as to whether the AF startup command output unit 123 has output the startup command, and thus determines whether the mode of the relative angle variation has been shifted from the unstable mode to the stable mode. If the mode of the relative angle variation has been shifted from the unstable mode to the stable mode, the reference additional result holder 242 proceeds to step S85. In step S85, the reference additional result holder 242 determines whether the reference sum result hadd_w1_f0 has been stored thereon. If it is determined that the reference sum result hadd_w1_f0 has been stored, the reference additional result holder 242 deletes the stored reference sum result hadd_w1_f0 in step S86 for updating, and then processing proceeds to step S87. The reference additional result holder 242 stores, as the reference sum result hadd_w1_f0, the latest sum (sum result hadd_w1_f1 of the evaluation values from the field before the current field by M fields to the current field, calculated by and stored on the evaluation value adder 241). When the updating of the reference sum result hadd_w1_f0 ends, the reference additional result holder 242 proceeds to step S88.

If it is determined in step S85 that no reference sum result hadd_w1_f0 has been stored, the reference additional result holder 242 proceeds to step S87 with step S86 skipped. The reference additional result holder 242 stores, as the reference sum result hadd_w1_f0, the latest sum (sum result hadd_w1_f1 of the evaluation values from the field before the current field by M fields to the current field, calculated by and stored on the evaluation value adder 241). When the storage of the reference sum result hadd_w1_f0 is completed, the reference additional result holder 242 proceeds to step S88.

If it is determined in step S84 that the mode has not been shifted from the unstable mode to the stable mode, the reference additional result holder 242 proceeds to step S88 without updating the reference sum result.

In step S88, the evaluation value variation rate calculator 243 references the mode flag 142 in the mode change detector 122 to determine whether the mode is a stable mode. If the mode is a stable mode, the evaluation value variation rate calculator 243 proceeds to step S89. The evaluation value variation rate calculator 243 acquires the latest sum result hadd_w1_f1 from the evaluation value adder 241, and the reference sum result hadd_w1_f0 from the reference additional result holder 242, and then calculates the evaluation value variation rate q0 based on the acquired sums. In step S90, the evaluation value variation rate determiner 244 compares the evaluation value variation rate q0, calculated in step S89, with the evaluation value variation rate q0, and determines whether to perform the AF process based on the comparison result. In step S91, the evaluation value variation rate determiner 244 outputs the determination result to the AF startup command output unit 123 to end the evaluation value change detection process. Processing returns to step S63 of FIG. 14 to perform step S64 and subsequent steps.

Figure 15:
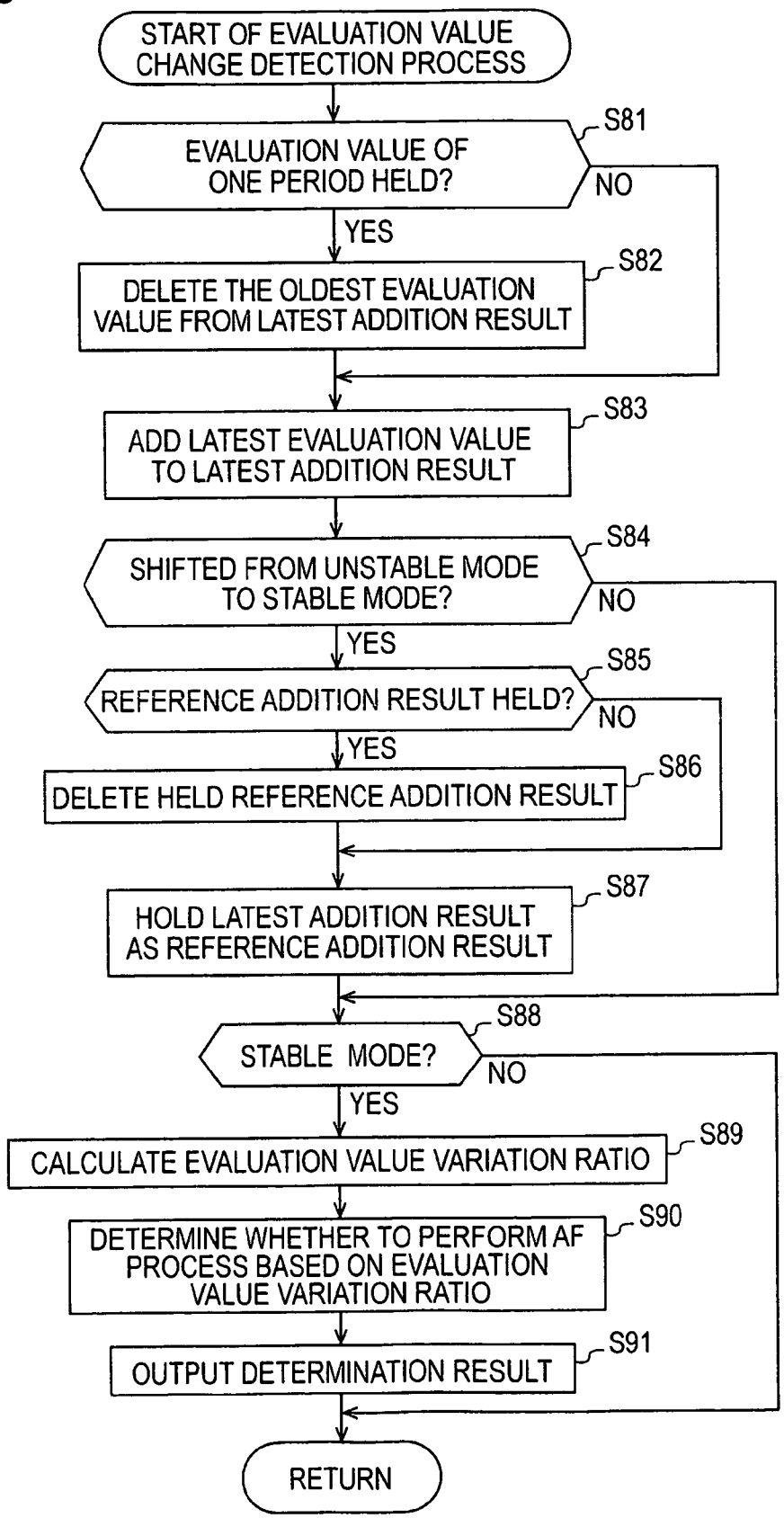
FIG. 15 is a flowchart illustrating in detail a evaluation value change detection process.

If it is determined in step S88 FIG. 15 that the image pickup apparatus 200 is not in the stable mode, the evaluation value variation rate calculator 243 ends the evaluation value change detection process without calculating the evaluation value variation rate, and returns to step S63 of FIG. 14 to perform step S64 and subsequent steps.

With the above-described process steps performed, the AF startup controller 212 performs a reliable AF process with unnecessary AF process reduced. The image pickup apparatus 200 thus provides a high-quality image.

In the above discussion, the evaluation values are summed over a predetermined period (M fields). The present invention is not limited to that method. The mean value of the evaluation values may be used, or the evaluation value of one field may be used. The evaluation value variation rate may be calculated based on the evaluation value of the current field and the evaluation value of the field at the moment the mode is shifted from the unstable mode to the stable mode. A rise in the evaluation value variation rate due to the movement of the subject shown in FIGS. 7A and 7B (i.e., startup of unnecessary AF process) is controlled by calculating the evaluation value variation rate from the evaluation value that is obtained by integrating the evaluation values over a significant duration of time (over a plurality of fields).

The image pickup apparatus may perform the AF startup control taking into consideration the sum of the relative angle variations of the camera with reference to the subject, as a parameter for controlling the startup of the AF process.

FIG. 16, corresponding to FIG. 4, is a block diagram illustrating in detail another example of the AF startup controller 82 in the image pickup apparatus 50 of FIG. 3.

The AF startup controller 82 of FIG. 16 includes the relative angle variation calculator 121, the mode change detector 122, the AF startup command output unit 123, and an integrated luminance value change detector 301.

The integrated luminance value change detector 301 monitors a change in the in-field integrated luminance value, and performs the AF startup control in response to the variation. The integrated luminance value change detector 301 includes a latest in-field integrated luminance value acquisition unit 311, a reference in-field integrated luminance value holder 312, an integrated luminance value variation rate calculator 313, and an integrated luminance value variation rate determiner 314.

The latest in-field integrated luminance value acquisition unit 311 acquires an in-field integrated luminance value y_now of the latest field (current field) from the in-field integrated luminance value calculator 131 in the relative angle variation calculator 121.

The reference in-field integrated luminance value holder 312 acquires and stores, as a reference in-field integrated luminance value y_jp, a latest in-field integrated luminance value y_now from the latest in-field integrated luminance value acquisition unit 311 immediately subsequent to stabilization (immediately subsequent to shifting from the unstable mode to the stable mode). If it is determined that the AF startup command output unit 123 has output an AF startup command (i.e., if it is determined that the apparatus has shifted from the unstable mode to the stable mode), the reference in-field integrated luminance value holder 312 stores, as the reference in-field integrated luminance value y_jp, the latest in-field integrated luminance value y_now stored on the latest in-field integrated luminance value acquisition unit 311. If an existing reference in-field integrated luminance value y_jp is present, the reference in-field integrated luminance value holder 312 first deletes the existing reference in-field integrated luminance value y_jp, and stores, as a new reference in-field integrated luminance value y_jp, a newest in-field integrated luminance value y_now stored on the latest in-field integrated luminance value acquisition unit 311.

If the value in the mode flag 142 in the mode change detector 122 indicates the stable mode, the integrated luminance value variation rate calculator 313 calculates an integrated luminance value variation rate r0 indicating the magnitude of a variation in the in-field integrated luminance value, in accordance with the following equation (4), using the latest in-field integrated luminance value y_now from the latest in-field integrated luminance value acquisition unit 311 and the reference in-field integrated luminance value y_jp from the reference in-field integrated luminance value holder 312, and then supplies the integrated luminance value variation rate r0 to the integrated luminance value variation rate determiner 314:

$$r0 = \frac{y\_now}{y\_jp} \quad (4)$$

The integrated luminance value variation rate determiner 314 determines whether to perform the AF process, based on the supplied integrated luminance value variation rate r0, and then outputs the determination result to the AF startup command output unit 123. For example, the integrated luminance value variation rate determiner 314 compares the supplied integrated luminance value variation rate r0 with a predetermined threshold value $\delta$ ($\delta$ is a natural number) or $1/\delta$. The integrated luminance value variation rate determiner 314 determines to start the AF process if the following equation (5) is satisfied, and determines not to start the AF process if the following equation (5) is not satisfied:

$$r0 < \frac{1}{\delta} \text{ or } \delta < r0 \quad (5)$$

The integrated luminance value variation rate determiner 314 supplies the determination result to the AF startup command output unit 123. The AF startup command output unit 123 supplies the startup command of the AF process to the AF control processor 83 based on the determination result of the mode change pattern from the mode change detector 122 and the determination result from the integrated luminance value variation rate determiner 314.

Using the AF startup control driven by the in-field integrated luminance value in combination, the image pickup apparatus 200 correctly performs the AF startup control on the subject free from an instantaneous sharp change in the in-field integrated luminance value thereof.

Figure 17A:
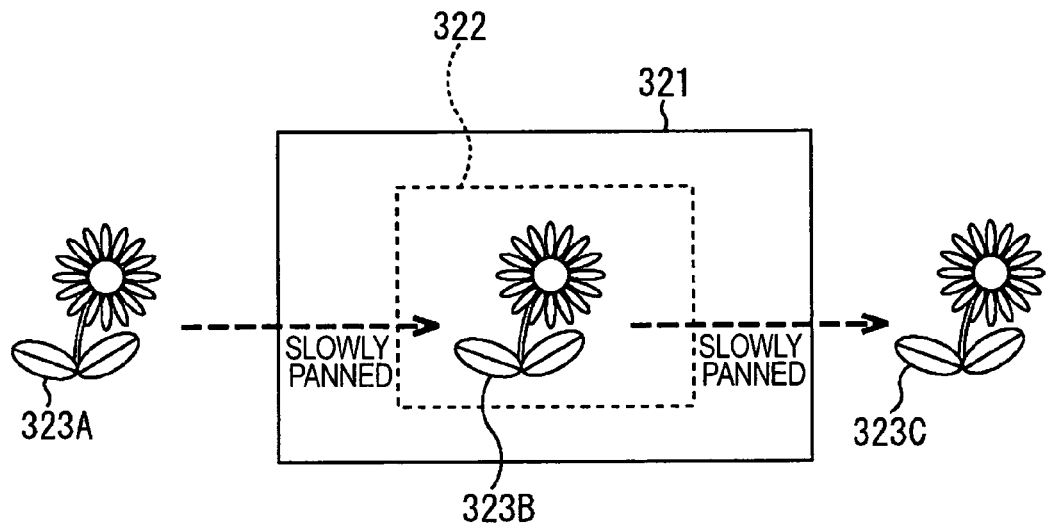
FIGS. 17A and 17B illustrate yet another example of the AF startup controller of FIG. 3.
Figure 17B:
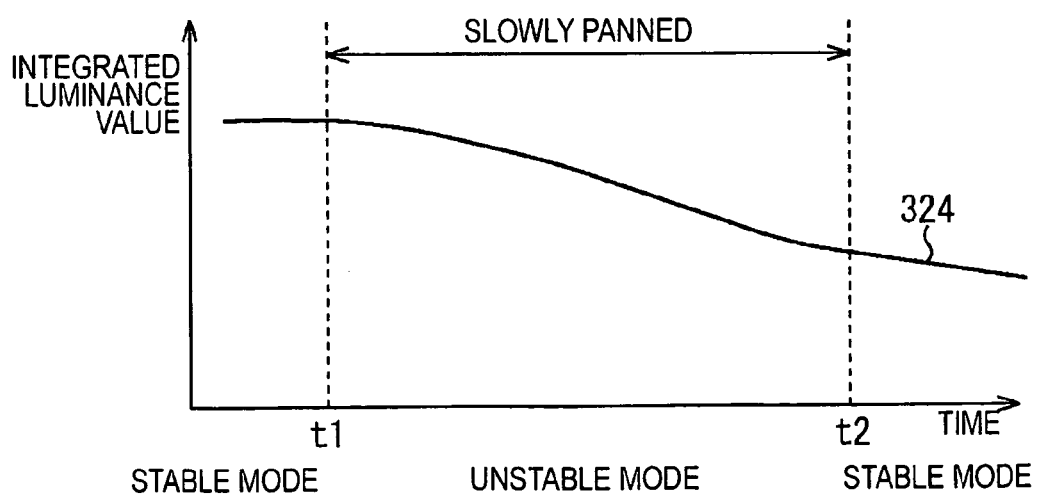

FIGS. 17A and 17B illustrate a specific example of the AF startup control process, in which the image pickup apparatus 50 is slowly panned.

As shown in FIG. 17A, the user slowly pans the image pickup apparatus 50 from left to right (i.e., the photographing direction slowly changed). In the same way as shown in FIG. 6A, although at a slower speed, the subject, which was initially outside the photographing frame 321 (as subject 323A), slowly enters the photographing frame 321 in the panning operation. As the image pickup apparatus 50 further pans, the subject was fully inside the photographing frame 321 (as subject 323B), and then leaves the photographing frame 321 from the left side thereof (as subject 323C).

If the image pickup apparatus 50 is slowly panned in this way, the in-field integrated luminance value changes gradually at a generally constant rate as represented by a curve 324 of FIG. 17B. Since the relative angle variation rate responsive to a change in the in-field integrated luminance value per unit time (i.e., per field) does not fluctuate greatly, the mode remains a stable mode, and the panning operation ends with the AF process unstarted (with the focus position fixed).

When the image pickup apparatus 50 is slowly panned at a constant speed, the user typically wishes to focus on the subject (such as the subject 323B) during panning. The AF startup controller 82 of FIG. 16 can perform precise focus position control at a slow panning speed. To focus on the subject 323B with the AF process started, the AF startup controller 82 thus performs the AF startup control process based on not only the magnitude of change in the relative angle variation (corresponding to the slope of the curve 324 of FIG. 17B) but also the change in the in-field integrated luminance value (corresponding to a difference between two points along the curve 234 of FIG. 17B).

If the in-field integrated luminance value changes from the in-field integrated luminance value at a field in the shifting to the stable mode by a predetermined rate (δ) or more, the AF startup controller 82 of FIG. 16 starts the AF process by determining that the content of the photographed image changes (i.e., that a new subject is being photographed or that a currently photographed is going out of the photographing frame 321), and then starts the AF process.

With the AF startup control performed, the image pickup apparatus 50 including the AF startup controller 82 of FIG. 16 uses the AF startup control process using the variation rate of the in-field integrated luminance value. The image pickup apparatus 50 thus prevents the photographed image from being out of focus with the AF process unstarted. More specifically, the image pickup apparatus 200 allows the user to easily control the focus position, and to perform a reliable AF startup control process.

The AF startup control process is described below with reference to a flowchart of FIG. 18. The flowchart of FIG. 18 corresponds to the flowcharts of FIG. 8 and FIG. 13.

When the AF startup control process is started, the relative angle variation calculator 121 in the AF startup controller 212 executes a relative angle variation calculation process in step S111. The relative angle variation calculation process is identical to that previously described with reference to the flowchart of FIG. 9, and the discussion thereof is omitted herein.

In step S112, the mode change detector 122 executes a mode change detection process. The mode change detection process is identical to that previously described with reference to the flowchart of FIG. 10, and the discussion thereof is omitted herein.

In step S113, the integrated luminance value change detector 301 performs an in-field integrated luminance value change detection process. The in-field integrated luminance value change detection process will be described in detail later.

In step S114, the AF startup command output unit 123 determines whether to start the AF process, based on the mode determination result supplied from the mode change detector 122, and the determination result supplied from the integrated luminance value change detector 301. Upon determining that the AF process is to start, the AF startup command output unit 123 proceeds to step S115 to output an AF process startup command, and then ends the AF startup control process. If it is determined in step S114 that the AF process is not to start, the AF startup command output unit 123 ends the AF startup control process with step S115 skipped.

Figure 18:
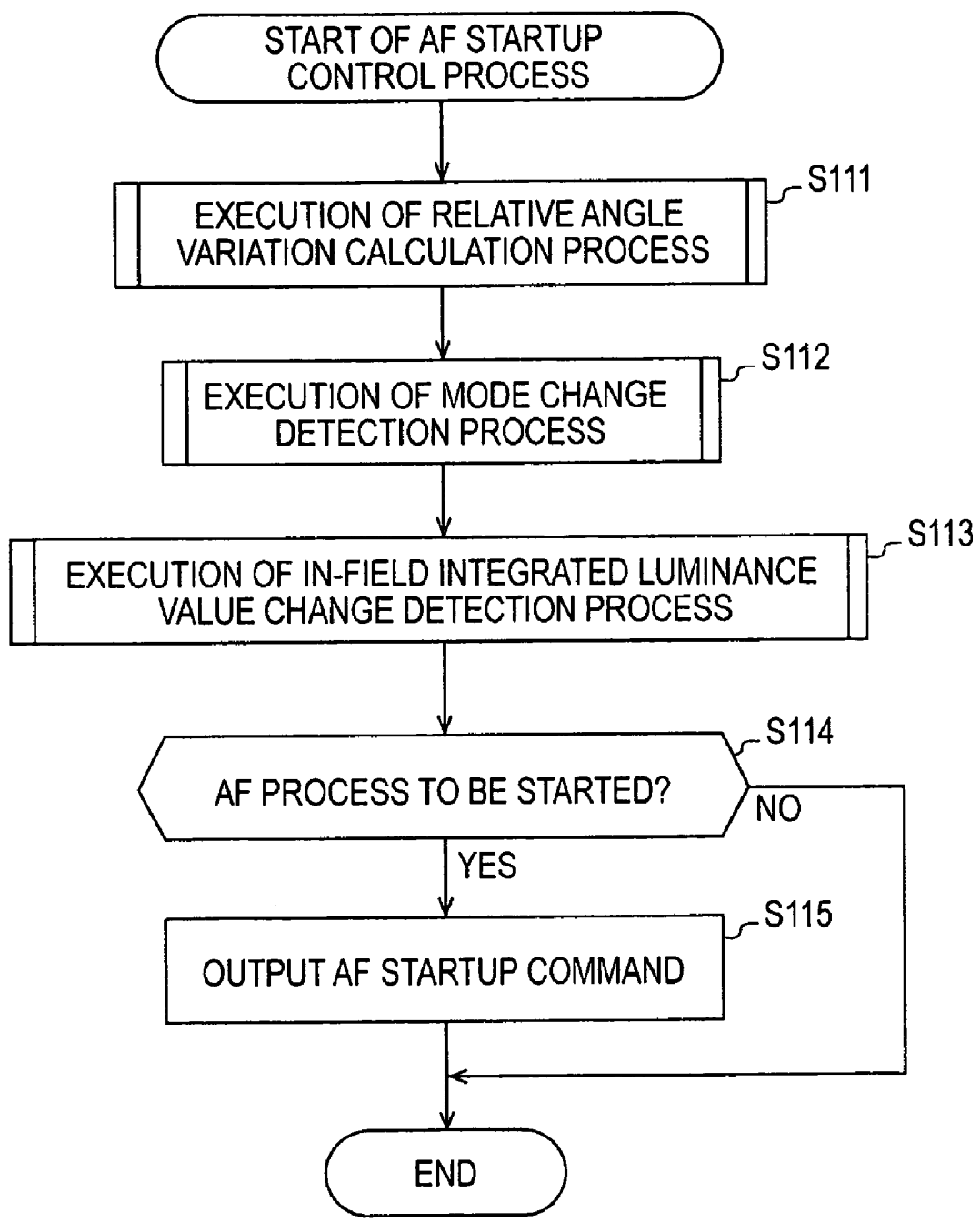
FIG. 18 is a flowchart illustrating a further example of the AF startup controller.
Figure 19:
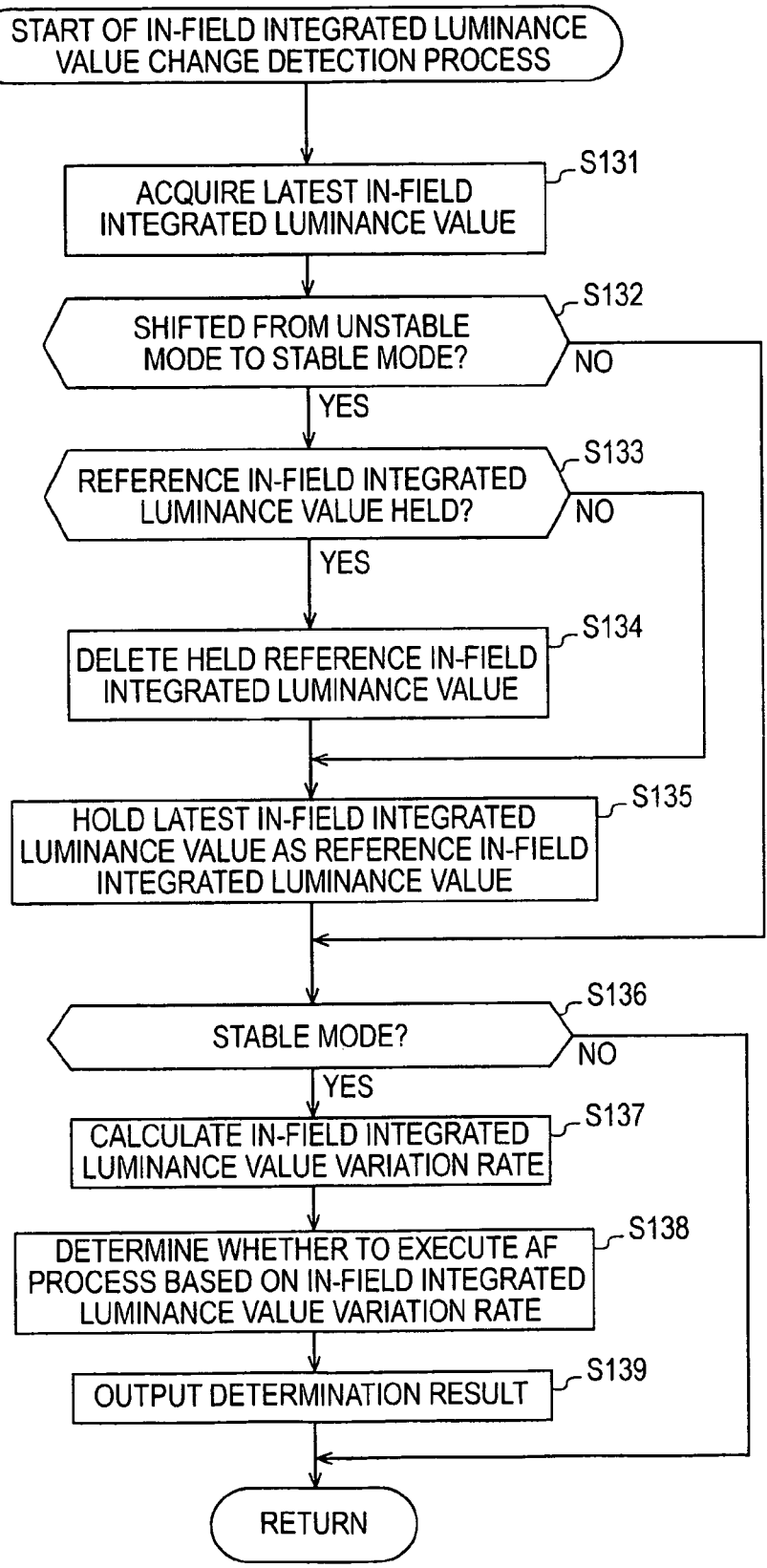
FIG. 19 is a flowchart illustrating in detail an in-field integrated luminance value change detection process.

The in-field integrated luminance value change detection process executed in step S113 of FIG. 18 is described in detail below with reference to a flowchart of FIG. 19.

When the in-field integrated luminance value change detection process is started, the latest in-field integrated luminance value acquisition unit 311 acquires the latest in-field integrated luminance value y_now from the relative angle variation calculator 121 in step S131. In step S132, the reference in-field integrated luminance value holder 312 acquires information as to whether the AF startup command output unit 123 has issued the startup command, determines whether the mode of the relative angle variation has shifted from the unstable mode to the stable mode, and processing proceeds to step S133 if it is determined the mode has shifted to the stable mode. In step S133, the reference in-field integrated luminance value holder 312 determines whether the reference in-field integrated luminance value y_jp is stored therewithin. If it is determined that the reference in-field integrated luminance value y_jp is stored, the reference in-field integrated luminance value holder 312 deletes the stored reference in-field integrated luminance value y_jp in step S134 to update the reference in-field integrated luminance value y_jp. In step S135, the reference in-field integrated luminance value holder 312 stores the latest in-field integrated luminance value y_now as the reference in-field integrated luminance value y_jp. When the updating of the reference in-field integrated luminance value y_jp is completed, the reference in-field integrated luminance value holder 312 proceeds to step S136.

If it is determined in step S133 that the reference in-field integrated luminance value y_jp is not stored, the reference in-field integrated luminance value holder 312 proceeds to step S135 skipping step S134 to store the latest in-field integrated luminance value y_now as the reference in-field integrated luminance value y_jp. When the storage of the reference in-field integrated luminance value y_jp is completed, the reference in-field integrated luminance value holder 312 proceeds to step S136.

If it is determined in step S132 that the mode has not shifted from the unstable mode to the stable mode, the reference in-field integrated luminance value holder 312 proceeds to step S136 without updating the reference in-field integrated luminance value y_jp.

In step S136, the integrated luminance value variation rate calculator 313 references the mode flag 142 in the mode change detector 122 to determine whether the mode is currently a stable mode. If it is determined that the mode is currently a stable mode, the integrated luminance value variation rate calculator 313 proceeds to step S137. The integrated luminance value variation rate calculator 313 acquires the latest in-field integrated luminance value y_now from the latest in-field integrated luminance value acquisition unit 311 and the reference in-field integrated luminance value y_jp from the reference in-field integrated luminance value holder 312, and calculates the integrated luminance value variation rate r0 based on the acquired values. In step S138, the integrated luminance value variation rate determiner 314 compares the integrated luminance value variation rate r0, calculated in step S137, with a predetermined threshold value. The integrated luminance value variation rate determiner 314 determines, based on the comparison result, whether to start the AF process. In step S139, the integrated luminance value variation rate determiner 314 outputs the determination result to the AF startup command output unit 123, and completes the in-field integrated luminance value change detection process. Processing proceeds to step S113 of FIG. 18 to perform step S114 and subsequent steps.

Figure 10:
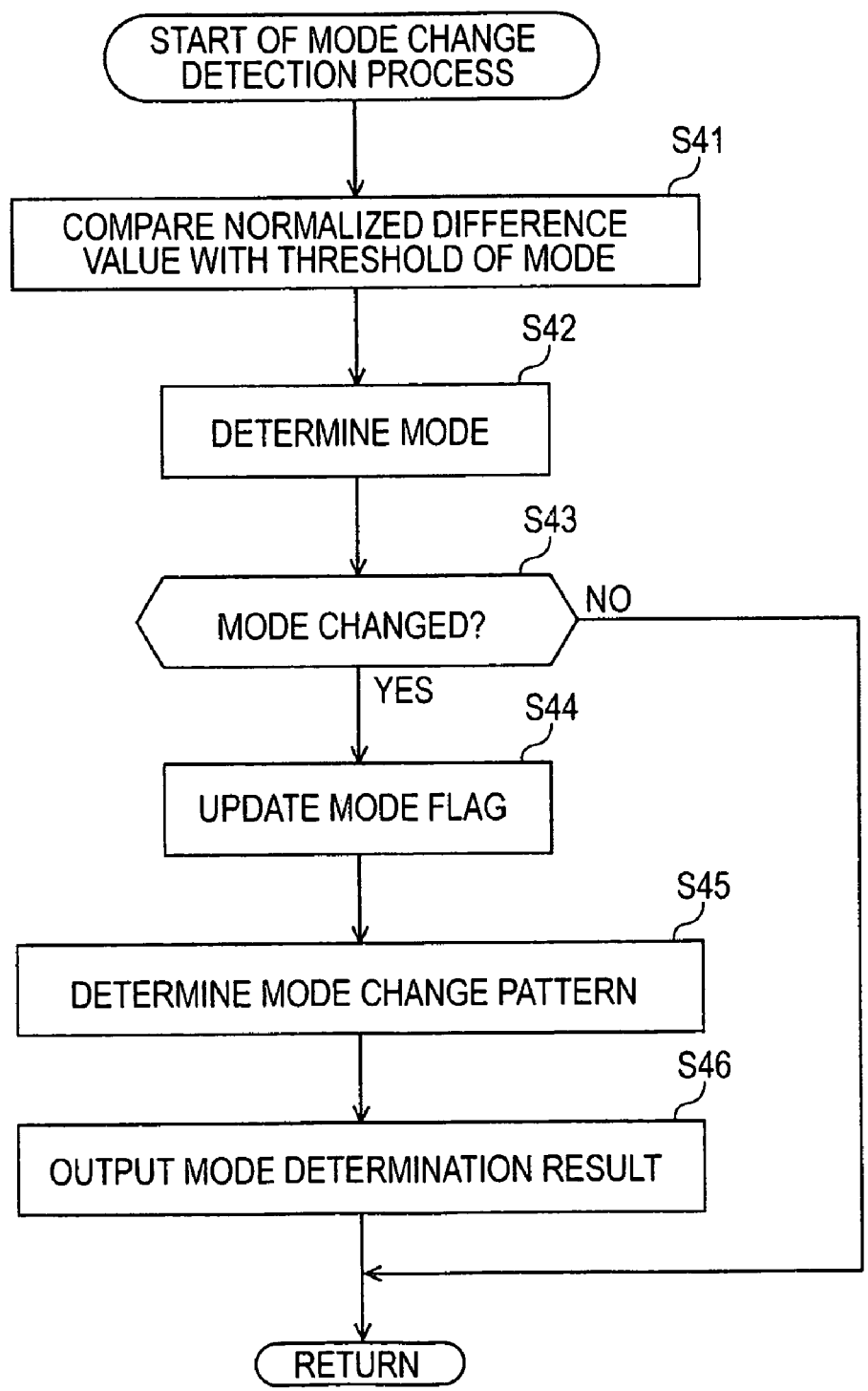
FIG. 10 is a flowchart illustrating a mode change detection process.

If it is determined in step S136 of FIG. 10 that the mode is not currently a stable mode, the integrated luminance value variation rate calculator 313 ends the in-field integrated luminance value change detection process without calculating the integrated luminance value variation rate r0. Processing returns to step S113 of FIG. 18 to perform step S114 and subsequent steps.

The AF startup controller 82 of FIG. 16 thus reduces the AF process eliminating the unnecessary portion thereof. For example, when the user pans the image pickup apparatus slowly at a constant speed, the AF startup controller 82 focuses on a subject the user may wish to photograph and starts the AF process for focusing. The AF process is thus reliably performed, resulting in a high-quality image. The AF process is equally reliably performed on the tilting operation, as well.

The above-described process steps may be performed using hardware or software. If the process steps are performed using software, a computer program forming the software can be installed from a recording medium or via a network.

The recording medium may include the removable medium 97 that is supplied separate from the apparatus body to supply the user with the computer program. The recording medium may also include the ROM 91 or the recording unit 94 (including a hard disk), each of which stores the computer program and is supplied in the apparatus body to the user.

The process steps forming the computer program stored on the recording medium can be performed in the sequential time-series order stated herein. Alternatively, the process steps may be performed in parallel or separately.

The apparatus described herein can be split among a plurality of units. Alternatively, an arrangement described as a plurality of units can be integrated into a single apparatus. An element, which is not described above, can be added to the system. As long as the entire apparatus remains unchanged in structure and operation, a portion of one unit can be included into another unit.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus for controlling a driver driving an optical element of an image pickup device to adjust a focus position of the image pickup device in the capturing of an image of a subject, the control apparatus comprising:

relative angle variation calculating means for calculating a relative angle variation, the relative angle variation being a change per unit time of a relative angle of the image pickup device with respect to the subject, the relative angle variation calculating means including in-field integrated luminance value calculating means for calculating an in-field integrated luminance value through integrating a luminance value of each pixel of the captured image of the subject within a field, mean value calculating means for calculating the mean value of the in-field integrated luminance values, calculated by the in-field integrated luminance value calculating means, within a time range having a predetermined time length, difference calculating means for calculating a difference value between the mean value of a first time range, equal to the time range having the predetermined time length, containing the current field and the mean value of a second time range immediately prior to the first time range, each mean value calculated by the mean value calculating means, and normalizing means for normalizing the difference value, calculated by the difference calculating means, with the in-field integrated luminance value of the current field and the length of the time range, and handling the normalized difference value as the relative angle variation;

mode change detecting means for detecting of a change of a mode of the relative angle variation through determining whether the mode of the relative angle variation, calculated by the relative angle variation calculation means, is a stable mode involving a small amount of change or an unstable mode involving a large amount of change; and focus position control process startup means for managing a startup of a focus position control process, the focus position control process for controlling the focus position through controlling the driver in response to a pattern of the change of the mode detected by the mode change detecting means.

2. The control apparatus according to claim 1, further comprising focus position control process executing means for executing the focus position control process started by the focus position control process startup means.

3. The control apparatus according to claim 1, wherein the focus position control process startup means starts the focus position control process if the change of the mode detected by the mode change detecting means is a change from the unstable mode to the stable mode.

4. The control apparatus according to claim 1, wherein the focus position control process startup means starts the focus position control process only if the change of the mode detected by the mode change detecting means is a change from the unstable mode to the stable mode.

5. The control apparatus according to claim 1, wherein the in-field integrated luminance value calculating means integrates the luminance value of each pixel in a predetermined area in the captured image and handles the resulting value as the in-field integrated luminance value.

6. The control apparatus according to claim 5, wherein the predetermined area is set up independently of an area over which a parameter for use in the focus position control process is calculated.

7. The control apparatus according to claim 5, wherein the predetermined area contains an area over which a parameter for use in the focus position control process is calculated.

8. The control apparatus according to claim 5, wherein the predetermined area is the entire captured image.

9. The control apparatus according to claim 1, wherein the mode change detecting means comprises:

mode determining means for comparing the relative angle variation, calculated by the relative angle variation calculating means, with a predetermined threshold value, and determining that the mode is a stable mode if the relative angle variation is smaller than the predetermined threshold value and determining that the mode is an unstable mode if the relative angle variation is equal to or greater than the predetermined threshold value;

update verifying means for verifying, based on the determination result of the mode determining means, whether the setting of the mode is updated; and mode change pattern determining means for determining the pattern of the change of the mode at the updating of the mode setting verified by the update verifying means.

10. The control apparatus according to claim 1, further comprising evaluation value calculating means for calculating an evaluation value, evaluating an out-of-focus level of the captured image of the subject, as a parameter for the focus position control process; and evaluation value change detecting means for detecting a change in the evaluation value calculated by the evaluation value calculating means, wherein the focus position control process startup means starts the focus position control process in response to the change in the evaluation value detected by the evaluation value change detecting means even if the mode change detecting means does not detect a change in the mode with the mode remaining to be the stable mode.

11. The control apparatus according to claim 10, wherein the evaluation value change detecting means comprises:

evaluation value addition calculating means for adding the evaluation values, calculated by the evaluation value calculating means, in each predetermined time range;

reference addition result storage means for storing, as a reference addition result, an addition result obtained at the shifting from the unstable mode to the stable mode, from among the addition results obtained as a result of addition performed by the evaluation value addition calculating means;

evaluation value variation rate calculating means for calculating an evaluation value variation rate based on the addition result provided by the evaluation value addition calculating means and the reference addition result stored on the reference addition result storage means; and evaluation value variation rate determining means for determining whether to start the focus position control process, based on the evaluation value variation rate calculated by the evaluation value variation rate calculating means.

12. The control apparatus according to claim 1, further comprising integrated luminance value change detecting means for detecting a change in an in-field integrated luminance value based on the in-field integrated luminance value calculated by the relative angle variation calculating means, wherein the focus position control process startup means starts the focus position control process in response to the change in the in-field integrated luminance value detected by the integrated luminance value change detecting means even if the mode change detecting means detects no change in mode with the mode remaining to be the stable mode.

13. The control apparatus according to claim 12, wherein the integrated luminance value change detecting means comprises:

latest in-field integrated luminance value acquisition means for acquiring the latest in-field integrated luminance value calculated by the relative angle variation calculating means;

reference in-field integrated luminance value storage means for storing, as a reference in-field integrated luminance value, the in-field integrated luminance value obtained at the shifting from the unstable mode to the stable mode, from among the in-field integrated luminance values acquired by the latest in-field integrated luminance value acquisition means;

integrated luminance value variation rate calculating means for calculating an integrated luminance value variation rate as a variation rate of the in-field integrated luminance value, based on the latest in-field integrated luminance value acquired by the latest in-field integrated luminance value acquisition means and the reference in-field integrated luminance value stored on the reference in-field integrated luminance value storage means; and integrated luminance value variation rate determining means for determining whether to start the focus position control process, based on the integrated luminance value variation rate calculated by the integrated luminance value variation rate calculating means.

14. A control method of a control apparatus for controlling a driver driving an optical element of an image pickup device to adjust a focus position of the image pickup device in the capturing of an image of a subject, the control method comprising:

a relative angle variation calculating step of calculating a relative angle variation, based on the captured image of the subject provided by the image pickup device, the relative angle variation being a change per unit time of a relative angle of the image pickup device with respect to the subject, the relative angle variation calculating step including an in-field integrated luminance value calculating step of calculating an in-field integrated luminance value through integrating a luminance value of each pixel of the captured image of the subject within a field, a mean value calculating step of calculating the mean value of the in-field integrated luminance values, calculated by the in-field integrated luminance value calculating step, within a time range having a predetermined time length, a difference calculating step of calculating a difference value between the mean value of a first time range, equal to the time range having the predetermined time length, containing the current field and the mean value of a second time range immediately prior to the first time range, each mean value calculated by the mean value calculating step, and a normalizing step of normalizing the difference value, calculated by the difference calculating step. with the in-field integrated luminance value of the current field and the length of the time range, and handling the normalized difference value as the relative angle variation;

a mode change detecting step of detecting of a change of a mode of the relative angle variation through determining whether the mode of the relative angle variation, calculated in the relative angle variation calculation step, is a stable mode involving a small amount of change or an unstable mode involving a large amount of change;

a startup determination step of determining whether to start a focus position control process, the focus position control process for controlling the focus position through controlling the driver in response to a change pattern of the change of the mode detected in the mode change detecting step; and a focus position control process startup step of starting the focus position control process based on the determination result of the start determination step in order to cause the driver to adjust the focus position.

15. A computer-readable storage medium encoded with computer program instructions which when executed by a computer cause a processor to execute a method to control a driver driving an optical element of an image pickup device to adjust a focus position of the image pickup device in the capturing of an image of a subject, the method comprising:
   a relative angle variation calculating step of calculating a relative angle variation, based on the captured image of the subject provided by the image pickup device, the relative angle variation being a change per unit time of a relative angle of the image pickup device with respect to the subject, the relative angle variation calculating step including
      an in-field integrated luminance value calculating step of calculating an in-field integrated luminance value through integrating a luminance value of each pixel of the captured image of the subject within a field,
      a mean value calculating step of calculating the mean value of the in-field integrated luminance values, calculated by the in-field integrated luminance value calculating step, within a time range having a predetermined time length,
      a difference calculating step of calculating a difference value between the mean value of a first time range, equal to the time range having the predetermined time length, containing the current field and the mean value of a second time range immediately prior to the first time range, each mean value calculated by the mean value calculating step, and
      a normalizing step of normalizing the difference value, calculated by the difference calculating step, with the in-field integrated luminance value of the current field and the length of the time range, and handling the normalized difference value as the relative angle variation;
   a mode change detecting step of detecting of a change of a mode of the relative angle variation through determining whether the mode of the relative angle variation, calculated in the relative angle variation calculation step, is a stable mode involving a small amount of change or an unstable mode involving a large amount of change;
   a startup determination step of determining whether to start a focus position control process, the focus position control process for controlling the focus position through controlling the driver in response to a change pattern of the change of the mode detected in the mode change detecting step; and
   a focus position control process startup step of starting the focus position control process based on the determination result of the start determination step in order to cause the driver to adjust the focus position.

16. A camera having an image pickup device capturing an image of a subject, and a driver adjusting a focus position in the capturing of the image of the subject through the image pickup device, the camera comprising:
   relative angle variation calculating means for calculating a relative angle variation, the relative angle variation being a change per unit time of a relative angle of the image pickup device with respect to the subject, the relative angle variation calculating means including
      in-field integrated luminance value calculating means for calculating an in-field integrated luminance value through integrating a luminance value of each pixel of the captured image of the subject within a field,
      mean value calculating means for calculating the mean value of the in-field integrated luminance values, calculated by the in-field integrated luminance value calculating means, within a time range having a predetermined time length,
      difference calculating means for calculating a difference value between the mean value of a first time range, equal to the time range having the predetermined time length, containing the current field and the mean value of a second time range immediately prior to the first time range, each mean value calculated by the mean value calculating means, and
      normalizing means for normalizing the difference value, calculated by the difference calculating means, with the in-field integrated luminance value of the current field and the length of the time range, and handling the normalized difference value as the relative angle variation;
   mode change detecting means for detecting of a change of a mode of the relative angle variation through determining whether the mode of the relative angle variation, calculated by the relative angle variation calculation means, is a stable mode involving a small amount of change or an unstable mode involving a large amount of change;
   focus position control process startup means for managing a startup of a focus position control process, the focus position control process for controlling the focus position through controlling the driver in response to a pattern of the change of the mode detected by the mode change detecting means; and
   focus position control process executing means for executing the focus position control process, started by the focus position control process startup means, the focus position control process controlling the driver to control the focus position.

17. A control apparatus for controlling a driver driving an optical element of an image pickup device to adjust a focus position of the image pickup device in the capturing of an image of a subject, the control apparatus comprising:
   a relative angle variation calculating unit configured to calculate a relative angle variation, the relative angle variation being a change per unit time of a relative angle of the image pickup device with respect to the subject, the relative angle variation calculating unit including
      an in-field integrated luminance value calculating unit configured to calculate an in-field integrated luminance value through integrating a luminance value of each pixel of the captured image of the subject within a field,
      a mean value calculating unit configured to calculate the mean value of the in-field integrated luminance values, calculated by the in-field integrated luminance value calculating unit, within a time range having a predetermined time length,
      a difference calculating unit configured to calculate a difference value between the mean value of a first time range, equal to the time range having the predetermined time length, containing the current field and the mean value of a second time range immediately prior to the first time range, each mean value calculated by the mean value calculating unit, and
      a normalizing unit configured to normalize the difference value, calculated by the difference calculating unit, with the in-field integrated luminance value of the current field and the length of the time range, and configured to handle the normalized difference value as the relative angle variation;

a mode change detecting unit configured to detect a change of a mode of the relative angle variation through determining whether the mode of the relative angle variation, calculated by the relative angle variation calculating unit, is a stable mode involving a small amount of change or an unstable mode involving a large amount of change; and a focus position control process startup unit configured to manage a startup of a focus position control process, the focus position control process configured to control the focus position through controlling the driver in response to a pattern of the change of the mode detected by the mode change detecting unit.

18. A camera having an image pickup device capturing an image of a subject, and a driver driving an optical element to adjust a focus position in the capturing of the image of the subject through the image pickup device, the camera comprising:

a relative angle variation calculating unit configured to calculate a relative angle variation, the relative angle variation being a change per unit time of a relative angle of the image pickup device with respect to the subject, the relative angle variation calculating unit including an in-field integrated luminance value calculating unit configured to calculate an in-field integrated luminance value through integrating a luminance value of each pixel of the captured image of the subject within a field, a mean value calculating unit configured to calculate the mean value of the in-field integrated luminance values, calculated by the in-field integrated luminance value calculating unit, within a time range having a predetermined time length, a difference calculating unit configured to calculate a difference value between the mean value of a first time range, equal to the time range having the predetermined time length, containing the current field and the mean value of a second time range immediately prior to the first time range, each mean value calculated by the mean value calculating unit, and a normalizing unit configured to normalize the difference value, calculated by the difference calculating unit, with the in-field integrated luminance value of the current field and the length of the time range, and configured to handle the normalized difference value as the relative angle variation;

a mode change detecting unit configured to detect a change of a mode of the relative angle variation through determining whether the mode of the relative angle variation, calculated by the relative angle variation calculating unit, is a stable mode involving a small amount of change or an unstable mode involving a large amount of change;

a focus position control process startup unit configured to manage a startup of a focus position control process, the focus position control process configured to control the focus position through controlling the driver in response to a pattern of the change of the mode detected by the mode change detecting unit; and a focus position control process executing unit configured to execute the focus position control process, started by the focus position control process startup unit, the focus position control process configured to control the driver to control the focus position.

* * * * *